US009756458B1

(12) United States Patent
Chein et al.

(10) Patent No.: US 9,756,458 B1
(45) Date of Patent: Sep. 5, 2017

(54) DETERMINING USER COMMONALITIES AND DIFFERENCES

(71) Applicant: Amazon Technologies, Inc., Reno, NV (US)

(72) Inventors: Jason Shih Shen Chein, Bellevue, WA (US); Peter Thomas Killalea, Seattle, WA (US); Hilliard Bruce Siegel, Seattle, WA (US); Brent Russell Smith, Redmond, WA (US); Walter Manching Tseng, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 213 days.

(21) Appl. No.: 14/219,907

(22) Filed: Mar. 19, 2014

(51) Int. Cl.
*H04W 4/02* (2009.01)
*H04L 29/08* (2006.01)
*G06Q 30/02* (2012.01)
*H04W 8/18* (2009.01)

(52) U.S. Cl.
CPC ............ *H04W 4/02* (2013.01); *H04L 67/306* (2013.01); *G06Q 30/02* (2013.01); *H04L 67/18* (2013.01); *H04W 4/023* (2013.01); *H04W 8/18* (2013.01)

(58) Field of Classification Search
None
See application file for complete search history.

(56) References Cited

U.S. PATENT DOCUMENTS 5,806,045 A 9/1998 Biorge et al.
5,956,636 A 9/1999 Lipsit
6,123,259 A 9/2000 Ogasawara
6,587,835 B1 7/2003 Treyz et al.
6,651,053 B1 11/2003 Rothschild
6,676,017 B1 1/2004 Smith, III
6,859,831 B1 2/2005 Gelvin et al.
6,898,434 B2 5/2005 Pradhan et al.
6,922,686 B2 7/2005 Okamoto et al.
6,975,855 B1 12/2005 Wallenius
(Continued)

OTHER PUBLICATIONS

Notice of Allowance (Mail Date Aug. 1, 2006) for U.S. Appl. No. 10/371,469, filed Feb. 22, 2003; Confirmation No. 1388, 24 pages.
(Continued)

*Primary Examiner* — Charles Appiah
*Assistant Examiner* — Margaret G Mastrodonato
(74) *Attorney, Agent, or Firm* — Lee & Hayes, PLLC

(57) ABSTRACT

Some examples include determining a proximity between a first user device and a plurality of other user devices based at least in part on comparing location information of the first user device with location information for the plurality of other user devices. Additionally, a commonality may be determined that is associated with at least some user profiles of the other users, but is unassociated with a user profile of the first user. For example, the commonality may have a frequency of occurrence among the user profiles of the other users that is greater than the frequency of occurrence among user profiles associated with a larger population. In other examples, a first portable computing device may receive profile information from a nearby second portable computing device for determining a compatibility between a first user profile and a second user profile.

20 Claims, 8 Drawing Sheets

(56) References Cited

U.S. PATENT DOCUMENTS

| | | | |
|---|---|---|---|
| 6,975,873 | B1 | 12/2005 | Banks et al. |
| 7,127,261 | B2 | 10/2006 | Van Erlach |
| 7,284,191 | B2 | 10/2007 | Grefenstette et al. |
| 7,509,271 | B2 | 3/2009 | Uchimi et al. |
| 7,929,958 | B2 | 4/2011 | Van Erlach |
| 7,957,725 | B2 | 6/2011 | Van Erlach |
| 8,751,427 | B1* | 6/2014 | Mysen ............ H04L 67/306 705/14.58 |
| 2001/0026609 | A1 | 10/2001 | Weinstein et al. |
| 2001/0046657 | A1 | 11/2001 | Dorn |
| 2001/0049636 | A1 | 12/2001 | Hudda et al. |
| 2001/0054180 | A1 | 12/2001 | Atkinson |
| 2002/0013852 | A1 | 1/2002 | Janik |
| 2002/0024536 | A1 | 2/2002 | Kahan et al. |
| 2002/0035609 | A1 | 3/2002 | Lessard et al. |
| 2002/0087543 | A1 | 7/2002 | Saitou et al. |
| 2002/0088522 | A1 | 7/2002 | Uchino et al. |
| 2002/0098832 | A1 | 7/2002 | Fleischer et al. |
| 2002/0107027 | A1 | 8/2002 | O'Neil |
| 2002/0164977 | A1 | 11/2002 | Link, II et al. |
| 2002/0183068 | A1 | 12/2002 | Dunko et al. |
| 2003/0037104 | A1 | 2/2003 | Okamura |
| 2003/0074321 | A1 | 4/2003 | Peled |
| 2003/0083076 | A1 | 5/2003 | Pradhan et al. |
| 2003/0130857 | A1 | 7/2003 | Matsuo |
| 2003/0135493 | A1 | 7/2003 | Phelan et al. |
| 2003/0135494 | A1 | 7/2003 | Phelan et al. |
| 2003/0135581 | A1 | 7/2003 | Phelan et al. |
| 2003/0147518 | A1 | 8/2003 | Albal et al. |
| 2003/0154164 | A1 | 8/2003 | Mascavage, III et al. |
| 2003/0154480 | A1 | 8/2003 | Goldthwaite et al. |
| 2004/0002359 | A1 | 1/2004 | Deas et al. |
| 2004/0002904 | A1 | 1/2004 | Deas et al. |
| 2004/0192299 | A1 | 9/2004 | Wilson et al. |
| 2004/0203901 | A1 | 10/2004 | Wilson et al. |
| 2004/0203902 | A1 | 10/2004 | Wilson et al. |
| 2004/0203903 | A1 | 10/2004 | Wilson et al. |
| 2004/0204063 | A1 | 10/2004 | Van Erlach |
| 2006/0053378 | A1 | 3/2006 | Fano et al. |
| 2006/0085419 | A1* | 4/2006 | Rosen ............ G06F 17/3087 |
| 2006/0089792 | A1 | 4/2006 | Manber et al. |
| 2006/0230058 | A1 | 10/2006 | Morris |
| 2007/0155402 | A1 | 7/2007 | Van Erlach |
| 2008/0154895 | A1* | 6/2008 | Carmony ............ G06Q 50/22 |
| 2010/0297985 | A1 | 11/2010 | Van Erlach |
| 2011/0136477 | A1 | 6/2011 | Van Erlach |

OTHER PUBLICATIONS

Notice of Allowance (Mail Date Apr. 5, 2010) for U.S. Appl. No. 11/549,156, filed Oct. 13, 2006; Confirmation No. 6505. 7 pages.

Office action for U.S. Appl. No. 13/025,200, mailed on Jun. 6, 2013, Van Erlach, "Methods for Providing Enhanced Telecommunication Services ", 10 pages.

Requirement for Restriction/Election (Mail Date Dec. 7, 2009) for U.S. Appl. No. 11/549,156, filed Oct. 13, 2006; Confirmation No. 6505, 6 pages.

Response filed Feb. 8, 2010 to Requirement for Restriction/Election (Mail Date Dec. 7, 2009) for U.S. Appl. No. 11/549,156, filed Oct. 13, 2006; Confirmation No. 6505, 2 pages.

Requirement for Restriction/Election (Mail Date Oct. 28, 2010) for U.S. Appl. No. 12/795,831, filed Jun. 8, 2010; First Named Inventor: Julian Van Erlach; Confirmation No. 1690. 6 pages.

Nov. 23, 2010 Filed Response to Restriction for U.S. Appl. No. 12/795,831, filed Jun. 8, 2010; First Named Inventor: Julian Van Erlach; Confirmation No. 1690. 5 pages.

Notice of Allowance (Mail Date Feb. 2, 2011) for U.S. Appl. No. 12/795,831, filed Jun. 8, 2010; Confirmation No. 1690. 8 pages.

Final Office Action for U.S. Appl. No. 13/025,200, mailed on Sep. 20, 2013, Julian Van Erlach, "Methods for Providing Enhanced Telecommunication Services", 8 pages.

Office Action for U.S. Appl. No. 13/584,861, mailed on Oct. 30, 2013, Julian Van Erlach, "Methods for Providing Enhanced Telecommunication Services", 14 pages.

Office Action for U.S. Appl. No. 13/025,200, mailed on Mar. 7, 2014, Julian Van Erlach, "Methods for Providing Enhanced Telecommunication Services", 9 pages.

Final Office Action for U.S. Appl. No. 13/584,861, mailed on May 14, 2014, Julian Van Erlach, "Methods for Providing Enhanced Telecommunication Services", 21 pages.

* cited by examiner

DETERMINING USER COMMONALITIES AND DIFFERENCES

BACKGROUND

People use computing devices for a variety of purposes, such as making telephone calls, texting, accessing the Internet, sending and receiving emails, instant messaging, maintaining their calendars, viewing movies and television shows, playing music, reading electronic books, socializing, playing games, navigating, working, purchasing goods and services, and numerous other functions. These computing devices have become increasingly portable and wearable, such that users may often have a computing device on or about them nearly at all times. Finding ways to enhance the user experience of the users of these computing devices continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
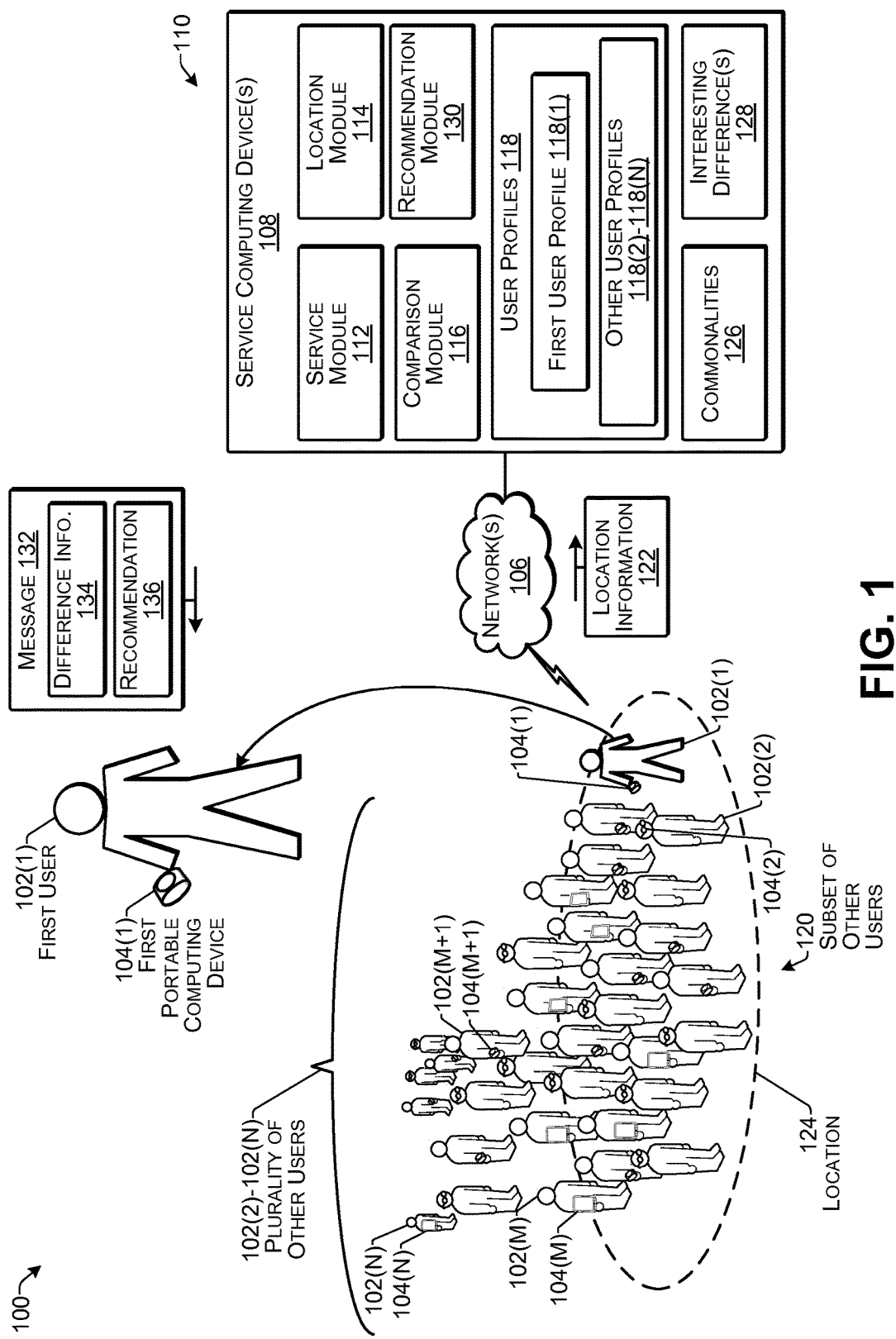
FIG. 1 illustrates an example architecture for a commonality determining service according to some implementations.

Some implementations herein include techniques and arrangements for determining a proximity between a first user of a first portable computing device and a set of other users of respective other portable computing devices, and further determining one or more interesting differences between the first user and some or all of the other users in the set of other users. For example, the interesting difference may be determined based on an interesting commonality that is associated with user profiles of a substantial portion of the other users, but which is not associated with a user profile of the first user. In response to determining the interesting commonality and difference, a recommendation, difference information, or other message related to the interesting commonality and difference may be sent to the first user.

In some examples, the set of other users may be established based at least in part on at least one of a physical proximity or a virtual proximity to the first user. For instance, the physical proximity may be established based on determining that the first user and the other users are present at a common location at the same time, such as by being within a threshold distance of each other. Additionally, or alternatively, the physical proximity may be established based on determining a common location that the first user and the other users have visited in the past. Additionally, or alternatively, the physical proximity may be established based on one or more of the first user and the other users being present at a particular location, while others of the first user and/or the other users may have visited the particular location in the past.

In some examples, the set of other users may be further established based at least in part on a location-based virtual proximity to the first user, such as by determining additional information about the first user and the other users in addition to location information. For instance, the first user and other users may work for the same employer, but may work at different geographically disparate locations. However, a location-based virtual proximity may be established between the users based on determining a social connection between users based on the different locations frequented by the users. For instance, in this example, the two geographically disparate locations are both places of employment for the same employer, and therefore are determined to be associated geographic locations. Additionally, or alternatively, the location-based virtual proximity may be established based at least in part on location information in numerous other situations, such as by identifying users that are members of the same club or group, users that participate in the same activities, and so forth.

In some examples, the techniques herein may provide a commonality determining service to one or more users of portable computing devices for determining commonalties among sets of users. With respect to a particular set of other users determined to have one or more commonalties with a first user, one or more surprising or otherwise interesting differences may be determined between the first user and some or all of the other users in the set. Various techniques for determining the interesting commonality and difference are discussed additionally below. Based at least in part on this interesting commonality and difference, a recommendation to purchase related goods or services may be sent to the first user, information about the interesting commonality and difference may be sent to the first user, and/or other suitable messages related to the interesting commonality and difference may be sent to the first user.

In some examples, the set of users may be initially determined based on at least one of a physical proximity or virtual proximity between the first user and the other people in the set of users. User profile information about the users in the set of users may be compared to determine commonalties among some or all of the users in the set, and further to determine which of these commonalties that are associated with the user profiles of some or all of the users in the set, but are not associated with the user profile of the first user. In response to identifying such a commonality that is not associated with the user profile of the first user, if the difference between the first user, who does not have an association with the commonality, and the other users in the set who do have the association with the commonality, is determined to be a sufficiently interesting difference, a message related to the interesting difference may be generated for the first user based at least in part on the interesting difference.

As one example, suppose that a first user is at a location, such as at work, at a convention center for a conference, at a coffee shop, at a party at a friend's house, in a school classroom, or the like. Based on the location, a service computing device of a service provider may identify a set of other users at the location by determining that respective portable computing devices of the other users in the set are also at the location. For instance, the portable computing devices of the first and other users may be associated with respective user accounts of the service provider, or otherwise able to communicate with the service computing device. The service computing device may identify other commonalties between some or all of the other users in the set of other users based on user profile information maintained by the service provider, and may identify at least one of these commonalties that is not shared by or is otherwise unassociated with the first user.

For instance, suppose that the first user works at a particular office building or for a particular company. The service computing device can identify a set of other users that also work with the first user, and are therefore proximate to the first user. As one example, the service computing device may determine based on location information received from a portable device of the first user and from portable devices of the other users that the first user and the other users frequent the particular office building during typical working hours, and therefore are likely to be employed by an employer than owns or occupies the particular office building. As another example, the service computing device may determine based on location information received from a portable device of the first user and from portable devices of the other users that the first user frequent a first building owned or occupied by the employer, while the other users frequent a second building owned or occupied by the employer at a different location, such as in a different city. Accordingly, while the first user and the other users may not be physically proximate, they may be virtually proximate based on frequenting associated geographic locations, i.e., geographic locations that are connected with each other, such as through a common business, common employer, common purpose, common use, and so forth.

The service computing device may further determine commonalties, such as 40 percent of the people in the set have read a particular book on management techniques, while the first user has not read this book. The service computing device may further determine that this is an interesting commonality based on a substantially smaller percentage, e.g., less than one percent, of a larger population of users having read this book. Based on this determination, the service computing device may send a message to the first user notifying the first user that 40 percent of the other users in the set have read the particular book, while the first user has not, and the message may further include a link for the first user to purchase the particular book. Thus, the anonymity of the other users in the set of other users may be maintained, but the first user may be provided with information that may help the first user, if desired, to better conform to the set of other users, develop knowledge, skills or achievements common to the set of other users, and so forth.

When determining the interesting commonality and difference, in some implementations, the interesting commonality and difference may be related to a basis for establishing the proximity of the set of users. For example, if the set of users is established based on a work location being a physical and/or virtual proximity, the interesting difference may be related to the work, such as the type of the business, information that could help the user advance in the business (e.g., a management techniques book, as in the example above), information that could help the business grow, and so forth. Additionally, or alternatively, the interesting difference may be determined based on conductiveness to selling a good or service to the first user, or assisting the first user in some fashion other than merely providing trivia to the user. For instance, in the case that the first user and the set of other users are in a hiking club, the interesting difference may be that 70 percent of the other users in the club have purchased a particular brand of hiking boot, while the first user has not.

As another example, the difference information may assist the first user in achieving a goal, such as in the case of a classroom setting. For instance, suppose that the first user is a student in a class. The service computing device may determine that 80 percent of the students in the class have completed a reading assignment, while the first user may have completed only half of the assignment. Thus, the commonality determining serve may provide the first user with an assessment of the current status of the first user with respect to other users in the class and/or motivation to complete the assignment.

As mentioned above, the interesting commonality and difference may be based at least in part on a commonality that is substantially different from a general population or other larger population of users. For instance, in the example, above, the interesting difference may be determined based at least part on determining that 40 percent of the user's co-workers in the set of people may have read the particular book on management techniques, whereas less than one percent of the general public in the same city, same state, same country, or other geographic region, may have read this particular book. Accordingly, when the frequency of occurrence of the commonality determined for the set of users is substantially greater than the frequency of occurrence of the same commonality among the larger population of users, this may be a suitable indicator for selecting an interesting difference. As one example, the frequency of occurrence of the commonality in the set of other users may be greater than one standard deviation from the frequency of occurrence in the larger population of users. As another example, the substantially greater frequency of occurrence may be that the user profiles of a majority of the other users in the set may be associated with the commonality, while the user profiles of a minority of the people in the larger population of users may be associated with the commonality. Various other techniques for determining the interesting commonality to use for the interesting difference will be apparent to those of skill in the art having the benefit of the disclosure herein.

Furthermore, in some examples, portable computing devices of the users can communicate directly with other co-located portable computing devices, to provide a social platform for the users. For example, the users of portable computing devices can elect to have certain information made available as public profile information. The portable computing devices of respective users can communicate directly with other co-located portable computing devices to evaluate the profile information of the respective other users located nearby. For instance, each portable computing device may compare the profile information available on nearby portable computing devices with the respective user's own profile information to determine possible common interests or other commonalties with various nearby users.

In some cases, the portable computing device may determine in real time, or near real time, compatibility between a first user and one or more nearby users. For instance, the compatibility may be determined based on a compatibility score indicating the relative strength of the compatibility between the users based on the comparison of the profile information. The portable computing device can also be configured to provide a list of topics that the users share in common, such as to serve as a conversation icebreaker. Further, in some cases, such as if, based on the profile information comparison, the initial compatibility score between a first user and a second user is sufficiently high, the respective portable computing devices of the first user and/or the second user may contact a remote service computing device of the service provider to obtain a comparison of additional commonalties between the first user and second user. For example, the service computing device may determine an additional, more comprehensive compatibility score.

For discussion purposes, some example implementations are described in the environment of determining commonalties between users of portable computing devices based on factors such as common locations, common backgrounds, common interests, common attributes, and the like. However, implementations herein are not limited to the particular examples provided, and may be extended to other factors and techniques for determining commonalties, other types of electronic devices, and so forth, as will be apparent to those of skill in the art in light of the disclosure herein.

FIG. 1 illustrates an example architecture 100 for providing a service based on user commonalties and differences according to some implementations. In this example, a first user 102(1) and a plurality of other users 102(2), . . . , 102(N) are each associated with a respective portable computing device 104(1) and 104(2), . . . , 104(N), which may also be referred to as user devices in some examples. In some examples, the portable computing devices 104 may include wearable computing devices, such as glasses computing devices, watch-type or other strap-mounted computing devices, computing devices incorporated into articles of clothing, and so forth, as well as other types of portable computing devices, such as smart phones, tablets, electronic book reader devices, laptops, and the like. For instance, the first user 102(1) is illustrated as wearing a first portable computing device 104(1) configured as a watch or other wristband type of computing device; a second user 102(2) is illustrated as wearing a second portable computing device 104(2) configured as a glasses-based computing device; an Mth user 102(M) is illustrated as carrying an Mth portable computing device 104(M), configured as a smart phone or tablet computing device; an Mth+1 user 102(M+1) is illustrates as wearing an Mth+1 portable computing device 104(M+1) configured as a watch or other wristband type of computing device; and an Nth user 102(N) is illustrated as carrying an Nth portable computing device 104(N), configured as a smart phone or tablet computing device, where M and N are integers and N is larger than M. Further, while several types of portable computing devices 104 are illustrated in this example, additional examples and features of the portable computing devices 104 are described below.

Each portable computing device 104 may include one or more communication interfaces (not shown in FIG. 1) to enable the portable computing devices 104 to communicate with each other and/or remote computing devices, such as through one or more networks 106 and/or through direct or close-range communication technologies. For example, the portable computing devices 104 may be able to communicate with each other or remote computing devices through one or more of the Internet, cable networks, cellular networks, local wireless networks (e.g., Wi-Fi), close-range wireless connections (e.g., Bluetooth®, Bluetooth® 4.0 Low Energy, Wi-Fi Direct, IrDA or other infrared communication), near field communications (e.g., NFC RFID), wired networks or connections, or any other suitable communication technology. Additionally, in some examples, the portable computing devices 104 may support acoustic-based data transfer. Thus, one or more of radio-signal-based data transfer, light-based data transfer, acoustic-based data transfer, or any other suitable communication technology may be used for inter-device communication. Accordingly, in some examples, each the portable computing devices 104 may be able to communicate with other portable computing devices 104 over a network (such as via Wi-Fi or cellular) and/or directly (such as through close-range communications). Additionally, in some examples, the portable computing devices 104 herein may provide augmented reality functionality, such as through built-in features, e.g., as in the case of augmented reality glasses or goggles, and/or through software installed on the portable computing devices, e.g., as in the case of smart phones, tablets, and the like.

The one or more networks 106 may include a close-range network, an ad hoc network, a local area network (LAN), a wide area network (WAN), such as the Internet, or any combination thereof, and may include both wired and/or wireless communication technologies, including Bluetooth®, Wi-Fi and cellular communication technologies, as well as wired or fiber optic technologies. As one example, the one or more networks 106 may include a network access point, such as a wireless router, a network switch, or the like.

FIG. 1 further illustrates at least one service computing device 108 of a service provider 110. For instance, the service computing device 108 may include a service module 112 for providing a service to the users 102, such as a commonality determining service for determining commonalties among a plurality of users and differences based on those commonalties. Additionally, the service computing device 108 may include a location module 114 able to determine a location of one or more portable computing devices 104. The service computing device 108 may further include a comparison module 116 that may be executed to identify a set of users, determine commonalties among the users, and determine one or more interesting differences based on one or more of the commonalties. For example, the service computing device 108 may maintain or may access user profiles 118, such as a first user profile 118(1) and respective other user profiles 118(2)-118(N). Thus, each user 102 may be associated with a user profile 118. Various examples of the user profile information that might be included in a user profile 118 are discussed additionally below, such as with respect to FIG. 2.

In the example of FIG. 1, a subset 120 of other users and respective second portable computing devices that are proximate to the first user 102(1) and the first portable computing device 104(1) may be initially determined based on location information 122 received from a plurality of the portable computing devices 104. For instance, the location module 114 may compare location information received from the portable computing devices 104 for determining physical proximity. Accordingly, in this example, the proximity may be determined to exist between the first user 102(1) and the other users 102(2)-102(M) in the subset 120 of other users based on determining that the users 102(1)-102(M) are present at a location 124. For instance, the location information 122 may indicate that the first user 102(1) is at the location 124. The location information 122 may further indicate that the other users 102(2)-102(M) are at the location 124.

In some cases, the location module 114 may determine the location 124 of a portable computing device 104 based on communication information, such as based on an identity of a particular cellular tower or wireless access point through which the portable computing device 104 is able to communicate. In other cases, the portable computing device 104 may determine its own location and may send this information as at least a portion of the location information 122 to the service computing device 108. For instance, the portable computing device 104 may determine its own location using one or more onboard sensors (not shown in FIG. 1), such as a GPS device or a communication interface that is able to determine signal strengths from one or more of the cell towers or the wireless access point(s). In some examples, the location module 114 may use the location information 122 received from the portable computing devices 104 for determine which portable computing devices 104 are within a threshold distance of one another for establishing proximity to one another.

Additionally or alternatively, the location module 114 may determine that the portable computing devices are at, or have been at in the past, at least one of an identifiable geographic location, or associated geographic locations. For example, identifiable geographic locations may include particular cities, venues, shopping malls, buildings, businesses, street addresses, rooms, and so forth. Additionally, associated geographic locations may be identifiable geographic locations that are disparate, but related based on a connection, such as a social connection, common ownership, common use, or the like. Examples of associated geographic locations may include facilities of the same company or business that are in different locations. In some cases, the location module 114 may refer to map information, such as from online map providers, and/or may refer to other information available from various websites for determining information associated with various locations at which the portable computing devices may be located. For example, the location module 114 may cross-reference GPS coordinates with a map to determine that the one or more portable computing devices are at a particular place of business, in a particular building, at a particular venue, at a particular address, in a particular room, and so forth. The location module 114 may further obtain additional information about the address, building, venue, etc., for determining a type, purpose, or other information about the location, and or for determining boundaries for the location. Thus, the location module 114 can determine that a plurality of portable computing devices are in a particular building, and therefore at a same location and proximate to each other, while other portable computing devices may be nearby, but in other unrelated buildings, and therefore may not be determined to be at the same location and not proximate. Other techniques for determining the location of a portable computing device 104 will be apparent to those of skill in the art having the benefit of the disclosure herein.

The location module 114 on the service computing device 108 may receive the location information 122, and may identify the first portable computing device 104(1). Further, the location module 114 may determine the location 124 of the first portable computing device 104(1). By accessing the user profiles 118, the location module 114 may further determine that the first portable computing device 104(1) is associated with the first user 102(1) and the first user profile 118(1). In some examples, the comparison module 116 may establish the subset 120 of users while the users in the subset 120 are at the location 124, e.g., dynamically in real time or near real time. In other examples, the comparison module may establish the subset 120 based on one or more of the users 102 having visited the location at some point in the past. Further, as discussed in other examples herein, other commonalties may be used for establishing the subset 120, instead of the users 102 being co-located at a particular location 124 in the present, or having visited the particular location 124 in the past.

At least partially in response to establishing the subset 120 of users based on proximity, the comparison module 116 may determine one or more commonalties 126 by comparing information from the user profile 118 of each user with the information from the user profile 118 of each other user to initially determine matching information among a plurality of the user profiles 118. Thus, information from the respective user profile 118 for each user 102(2)-102(M) in the subset 120 of other users is compared with information from the user profile 118 for each other user 102(2)-102(M) in the subset 120 and also the with the information from the first user profile 118(1) for the first user 102(1). For instance, the user profile 118 may include various types of information related to the respective users 102(1)-102(M). In some cases, the users 102 may provide some user profile information when signing up for or otherwise consenting to the commonality determining service. Further, the user profile 118 may include information obtained based on online activities of the users, purchases made by the users through a merchant website, digital content items consumed by the users, such as books read, songs listened to, movies watched, etc. The user profile 118 may further include information on trips taken or other places visited by the users, and so forth. In addition, information obtained from social networks and other websites may further include interests of the users, profile information about the users, etc. Various other types of user profile information are described additionally below.

In some examples, the commonalties 126 determined between the users may be based on or geared toward determining one or more interesting differences 128 between the first user 102(1) and some or all of the other users in the subset 120 of users. For example, the commonalties 126 for determining the interesting difference 128 may include commonalties 126 related to the proximity upon which the subset 120 is established. Further, the commonalties 126 may be determined based at least in part on the ability to sell a good or service to the first user 102(1). For example, the determined commonalties 126 may include content items consumed by the users 102(2)-102(N), items purchased, services purchased, trips taken, and so forth.

Additionally, the commonalties 126 used for determining the interesting difference may be substantially outside of what is normal for the general public or other population of users larger than the subset 102, such as for a population of users that reside in the same the geographic region that includes the location 124. For example, if the commonality among the subset 120 is that a particular movie has been watched by 50 percent of the users in the subset 120, while only 5 percent of the general population of users in the same city have watched the movie, and if the first user 102(1) has not watched the movie, this may be determined to be an interesting difference 128. Accordingly, a substantial difference between the frequency of occurrence of a particular commonality determined for the subset 120 of users and the frequency of occurrence of the same commonality among the larger population may be a suitable indicator for selecting an interesting difference. As one example, the substantial difference in the frequency of occurrence for the commonality in the subset 120 may be greater than one standard deviation from the frequency of occurrence for the larger population. As another example, the substantially greater frequency of occurrence may be that the user profiles of a majority of the users in the subset 120 may be associated with the commonality, while the user profiles of only a minority of the users in the larger population of users may be associated with the commonality. In some examples, the larger population of users may be selected based on a same geographic location, such as all users residing in the same city, same state, same country, etc. In other examples, the larger population of users may be selected based on a diverse selected cross-section of a large number of users intended to represent a statistical norm for a population of users. Various other techniques for determining the substantial difference and/or for determining the commonality to use for the interesting difference will be apparent to those of skill in the art having the benefit of the disclosure herein.

Upon determining an interesting difference between the first user 102(1) and a plurality of other users in the subset 120, a recommendation module 130 executed on, or accessed by, the service computing device 108 may generate a message 132 to send to the first user 102(1) based at least in part on the interesting difference 128. For example, the message may include difference information 134 and/or may include a recommendation 136 related to the interesting difference 128. When the interesting difference 128 is related to a digital content item, e.g., a percentage of the subset 120 has purchased, viewed, read, accessed, or otherwise consumed the digital content item, the recommendation may include a link for the first user 102(1) to acquire or otherwise access the digital content item. Examples of digital content items may include electronic books, movies, television shows, music, songs, audio recordings and the like. Similarly, if the interesting difference 128 is related to a good or service available for purchase or by other type of the acquisition, the recommendation may include an offer to sell or otherwise provide the good or service to the first user 102(1).

As another example, if the interesting difference is related to an activity or achievement, such as traveling to a particular location, completing a classroom assignment, performing a type of physical activity, such as running a marathon, etc., the recommendation 136 may include information to assist the first user 102(1). For instance, if the interesting difference 128 is that a large percentage of the users in the subset 120 have traveled to a particular foreign location, while the first user has not, the recommendation may include information for purchasing travel to the foreign location, a link to travel guide book about the foreign location, and/or information about the foreign location. On the other hand, in the case that the interesting difference is related to completion of a class reading assignment, the message 132 may not necessarily include a recommendation 136, but instead may merely include the difference information 134 to give the first user 102(1) a status update regarding how the status of the of the first user differs from the subset 120 of users, i.e., the other students in the class. As another example, in a classroom setting, the comparison module may have determined that a large number of the students in the class have read a particular book related to the subject of the class, while the first user has not. Thus, the message 132 may include a recommendation for the first user to read the book, information about the book, and link for the first user 102(1) to purchase a physical or digital version of the book.

As another example, the location information 122 may be used for determining other types of commonalties between a plurality of users, in addition to determining particular locations visited by the users. For example, the portable computing devices 104 can provide location information that indicates, e.g., whether the respective user cycles to work, walks to work, takes public transportation to work, drives to work, or the like. Each of these different modes of commuting can indicate whether the respective user shares a commonality with a different subset of users that commute in a similar manner.

Further, while the examples herein are described in the context of providing the first user with a message, it should be understood that the service may be provided to each user in the subset of users. Thus, for each user at the location, various different interesting differences 128 may be determined based on the specific user profile information for each respective user. Thus, each particular user 102(1)-102(N) may receive a respective message 132 based on one or more interesting differences determined for the particular user.

Figure 2:
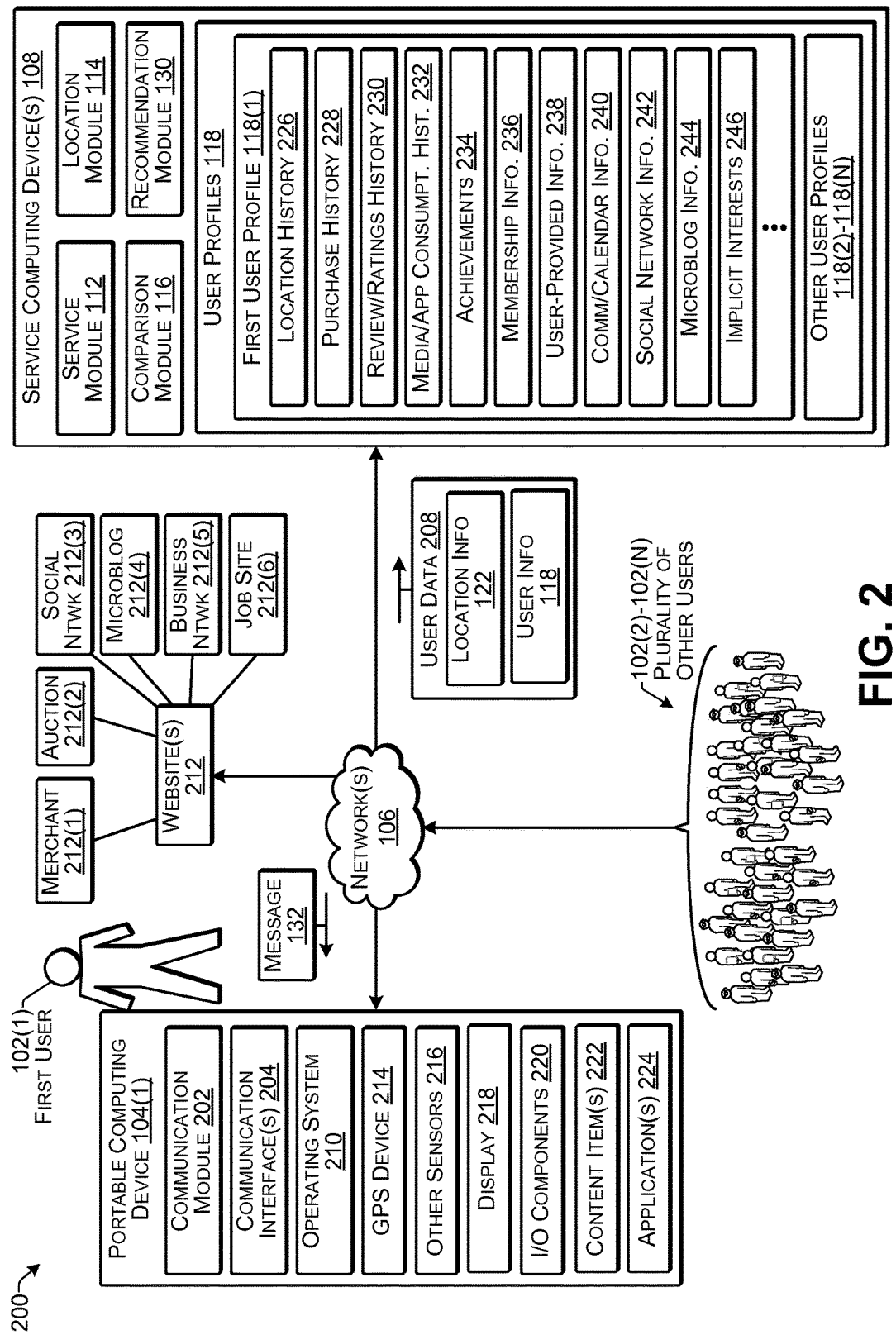
FIG. 2 illustrates an example system for a commonality determining service based on user commonalties and differences according to some implementations.

FIG. 2 illustrates an example system 200 for a commonality determining service according to some implementations. In this example, the portable computing device 104(1) includes a communication module 202 and one or more communication interfaces 204. For instance, the communication module 202 may communicate over the one or more networks 106 with the service module 112 on the service computing device 108. In addition, in some cases, the communication module 202 may communicate with other communication modules 202 on other portable computing devices 104. In some examples, the communication module 202 may be an application, such as a mobile application, configured to provide user data 208 to the service computing device 108. For example, the user data 208 may include the location information 122 discussed above and/or other types of user profile information as discussed below. In other examples, the communication module 202 may be part of, or may be accessed by, an operating system 210 of the portable computing device 104(1). Additionally, in other examples, the communication module 202 may be part of a web browser or any other suitable application or computer program.

FIG. 2 further illustrates the plurality of other users 102(2)-102(N) discussed above with respect to FIG. 1. For instance, the plurality of other users 102(2)-102(N) may include some or all of the users participating in the service, or for which the service computing device 108 otherwise maintains user profiles 118. Accordingly, the user profiles 118 may include the first user profile 118(1) for the first user 102(1) and the other user profiles 118(2)-118(N) for the plurality of other users 102(2)-102(N).

The communication interface(s) 204 may include one or more interfaces and hardware components for enabling communication with various other devices over the network(s) 106, such as the service computing device 108 and/or the portable computing devices 104. For example, communication interface(s) 204 may enable communication through one or more of the Internet, cable networks, cellular networks, local wireless networks (e.g., Wi-Fi, ad hoc networks), close-range wireless connections (e.g., Bluetooth®, Bluetooth® 4.0 Low Energy, Wi-Fi Direct, IrDA or other infrared communication, acoustic-based data transfer), near field communications (e.g., NFC RFID), wired networks or connections, or any other suitable communication technology. The portable computing devices 104 and the service computing device 108 may communicate and interact with one another using any combination of suitable communication and networking protocols, such as Internet protocol (IP), transmission control protocol (TCP), hypertext transfer protocol (HTTP), cellular communication protocols, and so forth.

Additionally, the one or more communication interfaces 204 of the portable computing device 104(1) may also function as location sensors in some cases. For example, the communication interfaces 204 can indicate a physical location of the portable computing device 104(1), such as based on identification of a cell tower, a wireless access point, or the like, that is within range of the portable computing device. For example, a Wi-Fi-based positioning system may be used where GPS information is inadequate such as due to signal blockage, or the like. A localization technique used for positioning based on one or more wireless access points can include measuring the intensity of the received signal. Additionally, other types of communication technologies, such as near-field communications and close-range communications may also indicate a position of the portable computing device 104(1) relative to other portable computing devices 104. In addition, the communication interfaces 204 may communicate with network resources, such as one or more websites 212, such for web browsing, making online purchases, accessing social networks, etc.

In addition, the portable computing device 104(1) may include a GPS (Global Positioning System) device 214, which may be used to provide at least a portion of the location information for the portable computing device 104(1). For instance, the GPS device 214 can identify a location of the portable computing device, and can detect movement of the portable computing device 104 from a first location to a second location, such as for providing information regarding possible mode of travel. In some examples, the GPS device 214 may be activated only periodically to conserve power unless movement of the portable computing device 104(1) has been detected, in which case the GPS device 214 may begin monitoring the direction of travel, velocity of travel, etc.

In addition, the portable computing device 104 may include other sensors 216, such as one or more accelerometers, one or more cameras, a gyroscope 428, a proximity sensor, and a compass, to name a few examples. For instance, the accelerometer(s) 420 can be monitored in the background to check for motion that is indicative of certain types of activity or movement of the portable computing device and the user. Various different types of motion, such as gaits, cadence, rhythmic movements, and the like, can be detected by the accelerometer and may be indicative of walking, jogging, running, and so forth. The other sensors may also provide information that is indicative of an activity of the user, which information may be used for determining various commonalties between the first user and the plurality of other users 102(2)-102(N). Further, in the case that the portable computing device is an augmented reality device, such as a helmet, goggles or glasses, the portable computing device 104 may have a front-facing camera that is active while the portable computing device 104 is in use for detecting various surroundings, objects, controllable devices, lighting, and so forth. Cameras in other types of portable computing devices 104 may be similarly used for determining a current activity or context of the user at a particular location, if permitted by the user.

In addition, the portable computing device 104(1) may include a display 218 for presenting information to the first user 102(1), and one or more I/O components 220 to enable the first user 102(1) to interact with the portable computing device 104(1). Additionally, the portable computing device 104(1) may include one or more content items 222 such as electronic books, movies, television shows, audio recordings and the like, which may indicate a current interest of the first user. For instance, "electronic book" and/or "eBook," as used herein, may include electronic or digital representations of printed works, as well as digital content that may include text, multimedia, hypertext, and/or hypermedia. Examples of electronic books include, but are not limited to, digital representations of books, magazines, newspapers, periodicals, journals, reference materials, textbooks, anthologies, instruction manuals, proceedings of meetings, forms, directories, plays, screen plays, closed captioning transcripts of movies and television shows, song lyrics, webpage content, and so forth.

Furthermore, the portable computing device 104(1) may include one or more applications 224, which may also indicate the interests and activities of the first user 102(1) at various different locations. The one or more applications 224 may include games as well as various other types of applications used for accomplishing various tasks or other functions. Furthermore, while the foregoing description discusses select configurations, components and functionality of the first portable computing device 104(1), the other portable computing devices 104 discussed in the examples herein may include similar configurations, similar components, similar data, similar functionality, and the like.

Accordingly, with the consent of the user, and/or under the direction of the user, numerous types of user data 208 may be provided to and/or stored by the service computing device 104 and maintained in the first user profile 118(1) when received with respect to the first portable computing device 104(1), or maintained in the respective other user profiles 118(2)-118(N) when received with respect to a respective computing device of a respective user of the plurality of other users 102(2)-102(N). Examples of the user profile information may include a location history 226, a purchase history 228, a review/ratings history 230, a media consumption history 232, achievements 234, membership information 236, user-provided information 238, communications and/or calendar information 240, social network information 242, microblog information 244, implicit interests 246, and so forth. For instance, the location history 226 may include information, such as locations that the respective user frequents, unusual locations that the user has been to, such as on vacation, home address, business address, and the like. Furthermore, the purchase history 228 may include information such as types of goods or services the user has purchased from the one or more websites 212, such as one or more merchant sites 212(1), auction sites 212(2), and so forth. The purchase history 228 may further include payment processing information, shopping or other browsing information, wish list information, and various other types of information related to purchases the user may have made online or may be considering making.

Additionally, the review/ratings history 230 may include any user ratings or other reviews of goods or services, e.g., restaurant reviews, product satisfaction ratings, movie reviews, book reviews, hotel reviews, and so forth. In addition, the media and application consumption history 232 may indicate content items 222 and applications 224 that the user has consumed or used in the past, such as books, movies, television shows, songs, games, various other applications, and the like. In some examples, the user data to determine the above-discussed histories 226-232 may be obtained without requiring the user to perform any affirmative action to compile the history information. For instance, when the user signs up or otherwise consents to the commonality determining service, the user may also consent to the service obtaining the user profile information from various sources.

Additional user profile information may be obtained from the user, or may be obtained based on examination of other available sources of information. For example, the achievements 234 may include achievements professed by the user, such as on a social network site 212(3) or a microblog site 212(4), as well as achievements that may be inferred based on other information, such as participation in a particular event, a listing of a finish times for a race, and so forth. Additionally, membership information 236 may include participation of the user in various organizations, clubs, alumni associations, online groups, forums and the like. Furthermore, the user-provided information 238 may include information obtained from one or more of the user's other profiles previously provided by the user, which may be publicly available e.g., at the social network site 212(3), a business networking site 212(5), from a user's resume posted at a job site 212(6), or the like. Alternatively, of course, the user may fill out a profile form online to provide specific user-provided information 238, e.g., background information, expressed interests, likes, dislikes, attributes, and so forth. For instance, when signing up for the service or otherwise agreeing to participate in the service, the user may fill out a questionnaire or visit a website to answer certain questions which can indicate various user-provided information 238 of the user. As one example, the user may provide user-provided information 238 for use in proximity-based commonality determination, as discussed below with respect to FIG. 4.

In addition, in some situations, the user may maintain communication and/or calendar information 240, which may include communication records, e.g., emails, text messages, and phone logs; and also calendar information, e.g., meeting participants, locations, etc., and may permit this information to be accessible to the service computing device 108 for purposes of the commonality determining service. Accordingly, the communication/calendar information 240 may indicate other users that the first user meets with on regular basis, other users with which the first user has had prior correspondence or communication, and so forth. Additionally, the social network information 242 may indicate friends of the user, friends of friends, and may provide posts of the user, comments made by the user, likes of the user, and so forth. For example, the social network information 242 may include topics or posts that the user has "liked" at social network sites or for which the user has otherwise indicated a liking or disliking. Further, the microblog information 244 may provide posts of the user, the identity of followers of the user, the identity of people followed by the user, and so forth.

In addition, the implicit interests 246 may include topics or other subjects in which the user has an interest, and which may be determined from any of the user profile information 226-244. For example, based on an examination of the user's purchase history and media consumption history, the comparison module 116, or other suitable module, may determine a particular genre of media preferred by the user, such as science fiction, military history, romance, mystery, or the like. The comparison module 116 may then use this implicit interest 246 for determining commonalties with the plurality of other users 102(2)-102(N). Furthermore, while several examples of user profile information have been provided and discussed herein, additional examples and variations will be apparent to those of skill in the art having the benefit of the disclosure herein.

Similar types of user profile information to those described above may also be obtained by the service computing device 108 for each of the plurality of other users 102(2)-102(N). Accordingly, the service computing device 104 may, to a greater or lesser extent, maintain similar user profile information in the other user profiles 118(2)-118(N) for the plurality of other users 102(2)-102(N), which may include respective user profiles for a large number of other users, as discussed above.

The comparison module 116 may determine a subset of other users from the plurality of other users 102(2)-102(N) based on physical or virtual proximity with the first user 102(1). As one example, as discussed above with respect to FIG. 1, the comparison module 116 may determine a subset of users based at least in part on a past or current location of first portable computing device 104(1) associated with the first user. Various techniques may be employed for determining a proximity between a portable computing device of the first user 102(1) and portable computing devices of a subset of the plurality of other users 102(2)-102(N) for identifying a particular subset of portable computing devices of users that share proximity with the first user.

Following determination of the proximity for a subset of portable computing device and associated users, at least one commonalty may be determined among the user profiles of the members of the subset. For example, the commonality may be determined as having a frequency of occurrence among the members of the subset that is substantially more frequent than the frequency of occurrence of the commonality in the larger population. In some cases, the commonality may be related to the proximity, or related to a good or service. For example, the commonality may be related to the proximity by being related to a location upon with the proximity is based, related to a basis for determining a virtual proximity, or the like. Further, or alternatively, the commonality may be related to a good or service that may be sold to the first user. In either event, a substantial difference between a frequency of occurrence of the commonality determined for the subset of users and a frequency of occurrence of the same commonality among the larger population may be a suitable indicator for selecting an interesting commonality as an interesting difference for the first user. As one example, the substantial difference in the frequency of occurrence may be greater than one standard deviation. As another example, the substantial difference in frequency of occurrence may be that user profiles of a majority of the users in the subset may be associated with the commonality, while user profiles of a minority of the people in a larger population may be associated with the commonality. Various other techniques for determining the interesting commonality to use for the interesting difference will be apparent to those of skill in the art having the benefit of the disclosure herein.

Additionally, in some examples, the comparison module 116 may determine a compatibility score between user profile information 118(1) of the first user 102(1) and user profile information 118(2)-118(N) of one or more other users in the plurality of other users 102(2)-102(N) or in a subset of the plurality of other users 102(2)-102(N). As one example, the number of commonalties between the respective user profile information of the first user 102(1) and another user may be added to compute the compatibility score. In some cases, when computing the compatibility score, certain commonalties may be given greater weight than other commonalties. For example, uncommon purchases by the users, such as a commonality of having purchased the same model of downhill ski that has been purchased by only a small percentage of other users may be weighted higher than having, for example, read the same book that has been read by a large number of the users in the plurality of other users 102(2)-102(N). Accordingly, the weightings for commonalties may be determined in a similar manner to the interesting commonalties and differences discussed above, i.e., the rarer the commonality is among the general population of the plurality of other users 102(2)-102(N), the higher the commonality may be weighted when calculating a compatibility score. In other words, the weighting of at least some commonalties may be inversely based at least in part on the frequency of occurrence of the commonality among the larger population of users. Accordingly, rather than requiring the users to fill out a profile or questionnaire, the commonalties, and thereby the compatibility, may be determined implicitly from various portions of the user profile information, such as may have been obtained from observation of past activities of the users, as discussed above.

Figure 3:
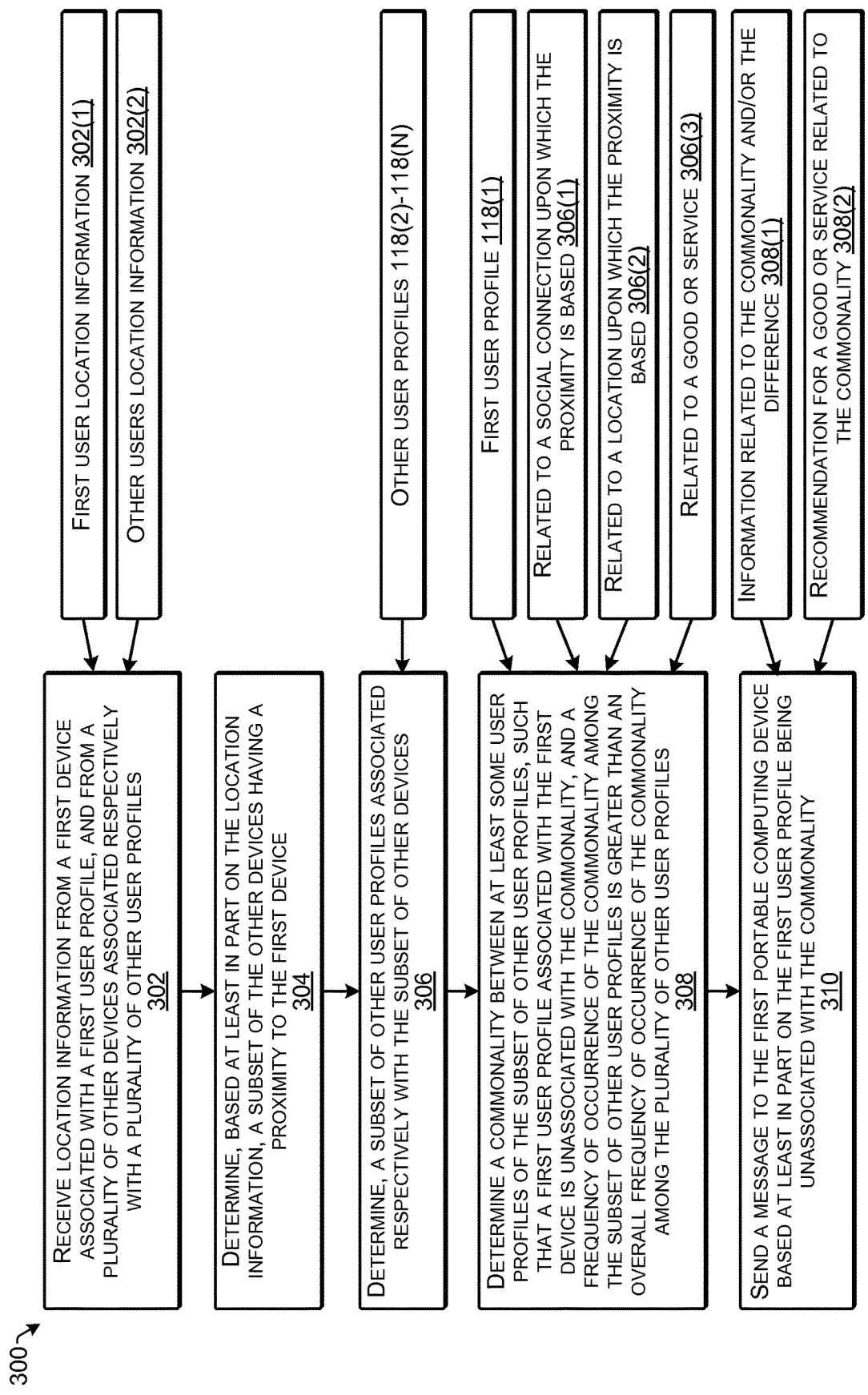
FIG. 3 is a flow diagram illustrating an example process for determining user commonalties according to some implementations.

FIG. 3 illustrates an example process for determining user profile information commonalties and differences according to some implementations. The process of FIG. 3 and the processes of FIGS. 7 and 8 below are illustrated as a collection of blocks in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures, systems and frameworks described in the examples herein, although the processes may be implemented in a wide variety of other architectures, environments or frameworks.

FIG. 3 is a flow diagram illustrating an example process 300 that may be executed, at least in part, by one or more service computing devices to perform a commonality determination service according to some implementations.

At 302, the one or more computing devices may receive location information from a first device associated with a first user profile, and from a plurality of other devices associated respectively with a plurality of other user profiles. For example, the proximity may be based on comparison of first location information 302(1) and second location information 302(2). In some examples, the proximity may be a physical proximity, which may be determined based at least in part on determining that the first portable computing device and the respective second portable computing devices associated with the subset of other user profiles are within a threshold distance of each other. Additionally or alternatively, the physical proximity may be determined based at least in part on determining that the first portable computing device and the respective second portable computing devices associated with the subset of other user profiles are present at the same geographic location or an associated geographic location. Additionally or alternatively, the physical proximity may be determined based at least in part on determining that the first portable computing device and the respective second portable computing devices associated with the subset of other user profiles have been present at a particular geographic location or an associated geographic location in the past.

Additionally or alternatively, the proximity between the first user profile and one or more of the other user profiles may be a location-based virtual proximity. For instance, the location-based virtual proximity may be determined based at least in part on comparing first user profile information associated with the first user and other user profile information associated with the subset of other user profiles. As mentioned above, the user profiles may include respective user location histories and may further include at least one of: user purchase histories, user review/ratings histories, user media consumption histories, user profile information, user social network information, user achievements, user membership information, user communication information, user microblog information, implicit user interests, and so forth. By cross-referencing location information with the other user profile information, social connections between users may be determined based at least in part on locations visited by respective users, even when the locations are not the same location, but instead are geographically disparate.

In some examples, particular geographic locations may identifiable locations, such as a particular building, a particular room, a house, a shopping mall, an address, or the like. As discussed additionally elsewhere herein, GPS information, wireless access point information, cell tower information, and information from the portable computing devices may be used to determine the location of the portable computing devices and their proximity to each other. Further particular locations, buildings, addresses, businesses, and the like, may be determined at least in part by cross-referencing location information received from the portable computing devices with map information available from online map sources. In addition, other online sources of information, such as various websites, and the like, that my provide information about various locations, such as for identifying social connections between various disparate associated geographic locations. For instance, a first user may frequent a first location that is associated with a particular employer. A second user may frequent a second location in another city that is also associated with the particular employer. Accordingly, the first location and the second location may be determined to be associated geographic locations since they are both connected to the same employer. Further, a social connection may be determined to exist between the first user and the second user based on the location information and being employed by the same employer. Thus, a location-based virtual proximity may be determined to exist between the first user and the second user based on the first user and the second user having been located at associated geographic locations. Various other social connections may be determined using associated geographic location information.

At 304, the one or more computing devices may determine, based at least in part on the location information, a subset of the other devices having a proximity to the first device. For example, as discussed above, the proximity may be determined based on physical proximity. Additionally or alternatively, the proximity may be based on a location-based virtual proximity. The location-based virtual proximity may be determined by determining a social connection between the first user and the other users by comparing the location histories 226 of the users. For example, when comparing the location histories, the one or more computing devices may access map information to determine purposes, names or other information about particular locations visited by the users. Further, the social connection may be determined by accessing the first user profile 118(1) and the other user profiles 118(2)-118(N). As discussed above, the user profiles 118 may include the various types of information, such as at least one of: the purchase history 228, the review/ratings history 230, the media consumption history 232, the achievements 234, the membership information 236, the user-provided information 238, the communications and/or calendar information 240, the social network information 242, the microblog information 244, the implicit interests 246, and so forth.

At 306, the one or more computing devices may determine a subset of other user profiles associated respectively with the subset of other devices. For example, the one or more computing devices may access the other user profiles 118(2)-118(N) to determine which of those profiles are associated with the subset of devices.

At 308, the one or more computing devices may determine a commonality between at least some a commonality between at least some user profiles of the subset of other user profiles, such that a first user profile associated with the first device is unassociated with the commonality, and a frequency of occurrence of the commonality among the subset of other user profiles is greater than an overall frequency of occurrence of the commonality among the plurality of other user profiles. For example, the subset of user profiles may be associated respectively with the second portable computing devices of the subset of second portable computing devices. Furthermore, first user profile 118(1) associated with the first portable computing device may be unassociated with the commonality. In addition, a frequency of occurrence of the commonality among the subset of other user profiles may be greater than an overall frequency of occurrence of the commonality among a plurality of the other user profiles associated respectively with the plurality of second portable computing devices. For instance, the commonality may be related to a social connection upon with the proximity is based, as indicated at 306(1); related to a location upon which the proximity is based, as indicated at 306(2); and/or related to a good or service, as indicated at 306(3).

Additionally, the commonality may be associated with user profiles corresponding to members of the subset of other devices at a frequency of occurrence that is substantially greater than a frequency of occurrence in a plurality of user profiles corresponding to a larger population, such as the general public. As an example, the commonalty may be established based on the users associated with the subset of second portable computing devices purchasing, consuming or reviewing the same product or service, liking the same thing on a social network, participating in the same organization or activity, etc. As another example, the commonality may be based on comparing business profile information and/or social network profile information from user profiles, such as for determining common educational backgrounds, common current or past employers, common interests, and so forth.

As mentioned above, the commonality may be associated with a subset of other user profiles and not associated with first user profile associated with the first user. Further, the commonality may have a frequency of occurrence, among the subset of other user profiles that is greater than a frequency of occurrence of the commonality among user profiles corresponding to a larger population of users, so that the commonality is interesting. For instance, the commonality may be determined as having a frequency of occurrence among the user profiles of the members of the subset of other users that is substantially more frequent than the frequency of occurrence of the commonality in the user profiles of the larger population. As one example, the substantially greater frequency of occurrence may be greater than one standard deviation. As another example, the substantially greater frequency of occurrence may be that user profiles of a majority of the subset of other users may be associated with the commonality, while the user profiles of a minority of the people in the larger population may be associated with the commonality. Further the commonality may be at least one of related to the basis for establishing the proximity, and/or related to a good or service. For example, the commonality may be related to the proximity as indicated at 306(1) or 306(2). Additionally, or alternatively, the commonality may be related to a good or service, as indicated at 306(3), that may be sold to the first user.

At 310, the one or more computing devices may send a message to the first device based at least in part on the first user profile being unassociated with the commonality. For example, the message may include information about the commonality and/or the difference, as indicated at 308(1), which provides the user with information about the difference between the first user profile and user profiles of the subset of other user profiles. Thus, the message may indicate that a percentage of the user profiles in the subset other user profiles are associated with the commonality and the first user profile of the first user is unassociated with the commonality. For instance, a particular percentage of people at a cocktail party that the first user is currently attending may have read a particular book, watched a particular television show, traveled to a particular foreign location, etc., and the percentage may be substantially greater than the percentage of the general public that may have done these things. Consequently, the first user may be informed that the first user differs from the subset of other users in this regard.

Additionally, or alternatively, the message may include a recommendation for a good or service, as indicated at 308(2). As several examples, the recommendation may be for a digital or physical media item, a software application, a physical product or any other item, or for a service, such as an invitation to eat at a restaurant, purchase travel to a particular location, participate in a particular activity, or the like. For instance, in the cocktail party example above, if 70 percent of the people at the party have read a particular book, and the first user has not, the message may include a recommendation for the first user to purchase the particular book, either in digital or physical format, a description of the book, a link for purchasing the book, and so forth.

Figure 4:
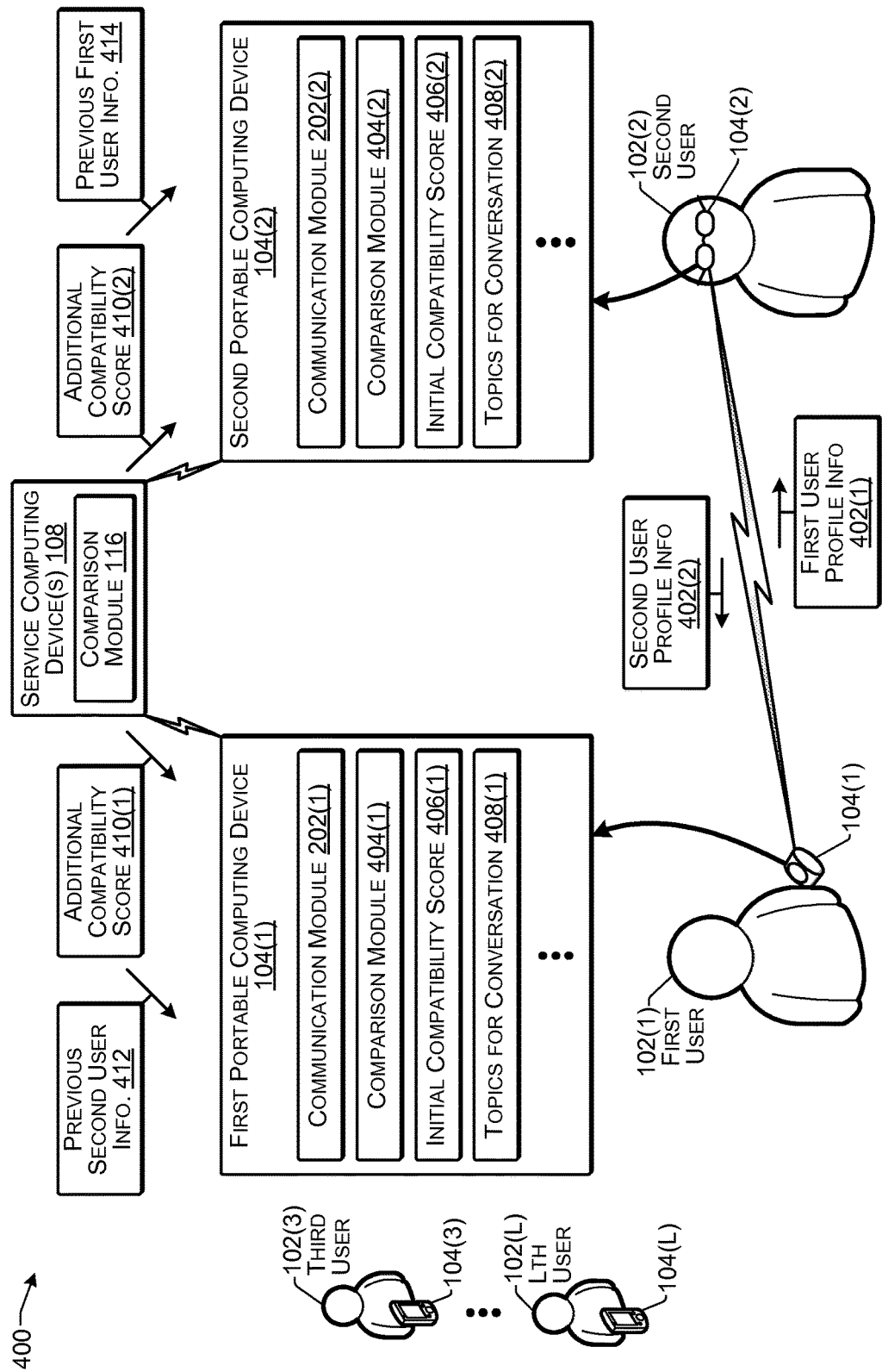
FIG. 4 illustrates an example architecture for determining user commonalties according to some implementations.

FIG. 4 illustrates an example architecture 400 for determining commonalties and/or compatibility dynamically based on location according to some implementations. In the illustrated example, the first user 102(1) wearing or otherwise carrying the first portable computing device 104(1) may be walking toward or otherwise located near the second user 102(2) who is wearing or otherwise carrying the second portable computing device 104(2). The first portable computing device 104(1) and the second portable computing device 104(2) may communicate directly with each other, or over a network, when they are within communication range or other threshold distance of each other.

As one example, the communication module 202(1) on the first portable computing device 104(1) may establish communication with the communication module 202(2) on the second portable computing device 104(2), such as through any suitable close-range or network-based communication protocol when the first portable computing device 104(1) and the second portable computing device 104(2) are within a threshold distance of each other. For instance, the communication module 202 may periodically poll an area around the portable computing device 104 to determine whether one or more other portable computing devices 104 are currently present within the threshold distance. As another example, the service computing device 108 may determine if two or more portable computing devices 104 are within a threshold distance of each other based on location information received from the portable computing devices 104, as discussed above. In response, the service computing device 108 may send a message to a least one of the portable computing devices 104, which may establish communication with the other portable computing device 104. For instance, the portable computing device 104 may determine its own location using one or more onboard sensors, such as a GPS device or a communication interface, as discussed above, and the information may be periodically provided to the service computing device 108. Numerous other techniques for detecting the presence of a portable computing device 104 within a threshold distance and/or identifying the portable computing device 104 will be apparent to those of skill in the art having the benefit of the disclosure herein.

Each portable computing device 104 may receive profile information 402 from the other portable computing device 104, and may include a comparison module 404 for comparing the received profile information with the profile information of its own respective user. Thus, following establishing communications, the first communication module 202(1) may send the first user's profile information 402(1) to the second portable computing device 104, and the second communication module 202(2) may send the second user's profile information 402(2) to the first portable computing device 104(1). For example, the profile information 402 of each user may include information that the user does not mind sharing with other users, such as basic user profile information (e.g., whether the user is male or female, city of residence, college or university, occupation, user interests, user activities, favorite and/or recent books read, movies watched, television shows watched, and so forth).

The comparison module 404 on the portable computing device 104 may determine an initial compatibility score 406 by comparing the profile information 402(1) and 402(2). For instance, the compatibility score may be calculated by adding values assigned to various commonalties. In some examples, the commonalties may be weighted differently, such as based on user assigned weightings, or using the weighting technique discussed above with respect to FIG. 2. As one example, the number of commonalties between the first user profile information 402(1) and the second user profile information 402(2) may be determined by identifying matching information, with each match counting as a commonality and then adding up the number of commonalties to determine the compatibility score 406. In some cases, when computing the compatibility score, certain commonalties may be given greater weight than other commonalties. For example, uncommon purchases by the users, such as a commonality of having purchased the same model of downhill ski that has been purchased by only a small percentage of other users may be weighted higher than having, for example, read the same book that has been read by a large majority of the general public. Accordingly, the weightings for commonalties may be determined in a similar manner to the interesting commonalties and differences discussed above, i.e., the rarer the commonality is among a general population of users, the higher the commonality may be weighted when calculating a compatibility between users. In other words, the weighting of at least some commonalties may be inversely based at least in part on the frequency of occurrence of each particular commonality among the larger population of users.

In some cases, if the initial compatibility score 406 is sufficiently high, e.g., exceeding a threshold compatibility score level, indicating a compatibility between the two users, the users may be notified by their respective portable computing devices 104. For example, the users may be notified by one or more of an audio indication, a haptic indication, and/or a visual indication on a display. As one example, in the case of the first portable computing device 102(1), which may be wrist mounted, the portable computing device may emit a sound that is indicative of a compatibility match, may vibrate or provide other haptic feedback, or may display the initial compatibility score 406(1) on a display. Additionally, in the case of the second portable computing device 104(2), which may include glasses or other augmented reality display capability, the initial compatibility score 406(2) and other information, such as topics for conversation 408(2), may be displayed directly to the second user 102(2), e.g., as an overlay on the user's field of vision. Further, in some examples, the overlay may include an arrow or other indicator pointing to the second user 102(2), such as when the second user 102(2) is in the first user's line of sight.

In addition, if the initial compatibility score 406 is sufficiently high, e.g., exceeding a threshold compatibility score level, which may be the same or different from the threshold for notifying the user, the portable computing device 104 may send information to the service computing device 108 to determine additional compatibility information. For example, suppose that the first comparison module 404(1) on the first portable computing device 104(1) determines an initial compatibility score 406(1) in response to receiving the second user's profile 402(2). In response to determining that the initial compatibility score 406(1) exceeds a threshold score level, the communication module 202(1) may send, to the service computing device 108, information related to the second user 102(2). For instance, the profile information 402 may include an identifier of the second user, such as a name, account identifier, user ID number, or the like. The communication module 202(1) may send this information to the service computing device 108.

In response to receiving the second user identifying information from the first portable computing device 104(1), the comparison module 116 on the service computing device 108 may access the user profile information 118 discussed above, and may perform an additional compatibility comparison. For example, the service computing device 108 may determine an additional compatibility score 410 based on a comparison of some or all of the user information maintained for the first user 102(1) and the second user 102(2), such as discussed above with respect to FIG. 2. For example, as one simple example, of a scoring technique, the comparison module on the service computing device 108 may add up the number commonalties between the first user and the second user. In some cases, one or more of the commonalties may be more highly weighted than others of the commonalties, as discussed above. The additional compatibility score 410(1) may be sent to the first portable computing device 104(1) for presentation to the first user 102(1). A similar additional compatibility score 410(2) may be sent to the second portable computing device 104(2), such as in response to the second portable computing device 104(2) sending identifying information related to the first user to the service computing device 108. Further, one or more additional topics for conversation may be sent by the service computing device 108 to the first portable computing device 104(1) and/or the second portable computing device 104(2).

In addition, if the first user 102(1) has met or interacted with the second user 102(2) previously, previous second user information 412 may be sent to or displayed by the first portable computing device 104(1), and similarly, previous first user information 414 may be sent to or displayed by the second portable computing device 104(2). As one example, the previous user information 412, 414 may include email communications, text message communications, or other types of electronic communications, as well as other interactions, such as meetings scheduled on a user calendar, or the like. For instance, one or more recent emails received from the second user may be automatically retrieved and displayed to the first user 102(1) or vice versa, to prepare the respective users for a conversation with each other.

In addition, suppose that additional users, such as a third user 102(3) having a third portable computing device 104(3), . . . , Lth user 102(L) having an Lth portable computing device 104(L) are within the threshold distance, i.e., communication range with the first portable computing device 104(1) and the second portable computing device 104(2). In some examples, a subset of users may be dynamically constructed by the comparison module 404(1) selecting a group of people with which the first user shares one or more commonalties based on the location and the profile information 402. The comparison module 404(1) may determine one or more interesting differences between the first user and the other members of the subset using techniques similar to those discussed above with respect to FIGS. 1-3. For example, the respective profile information of the respective users may include information such as last 10 books read, foreign places or other interesting places the users have visited, etc. Accordingly, similar to the examples of FIGS. 1-3 discussed above, a message may be generated for the first user, such as to provide the difference information and/or recommend a good, service, activity or the like to the first user to help the first user to conform with the other users in the subset of users.

Figure 5:
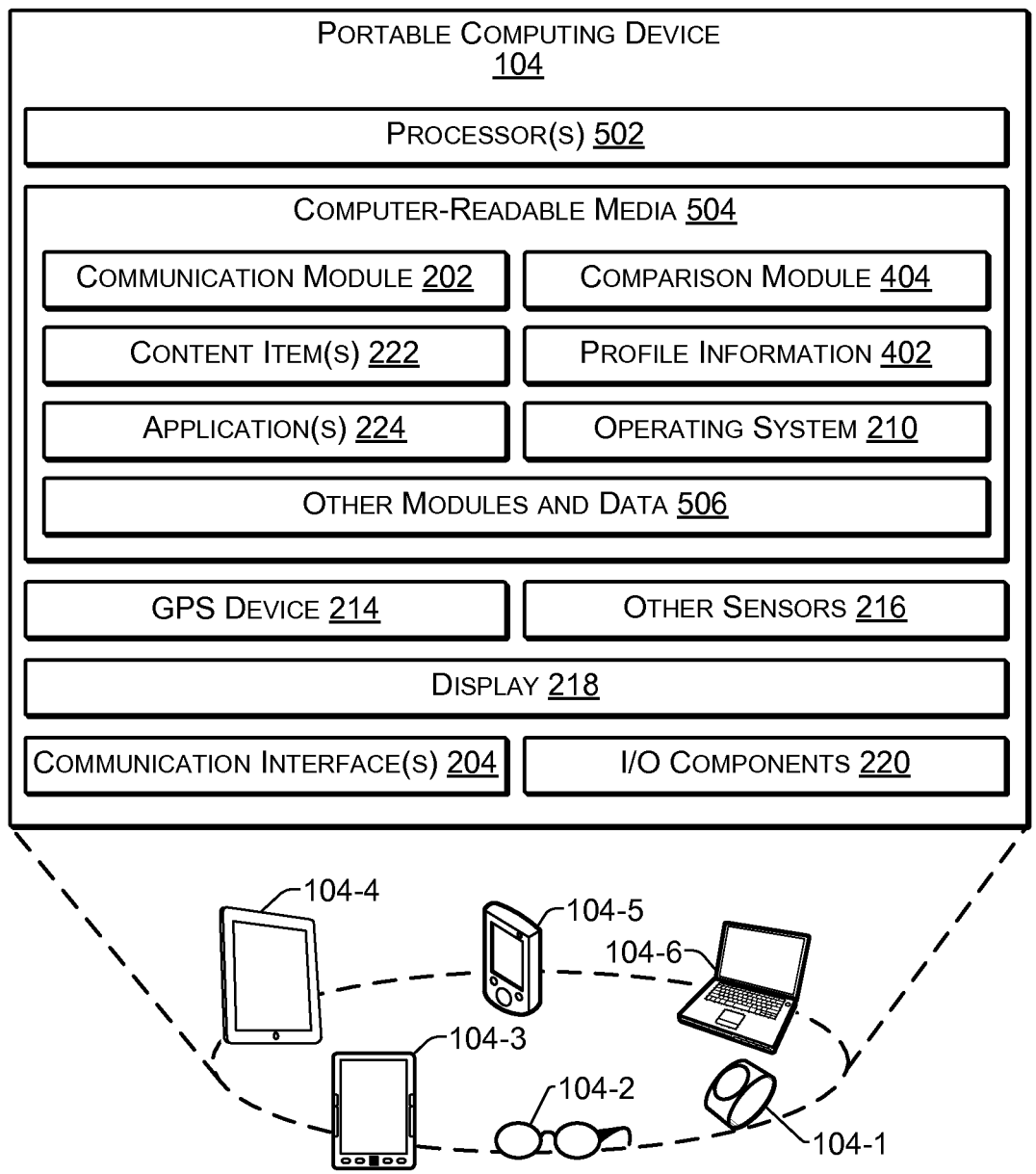
FIG. 5 illustrates select components of an example portable computing device according to some implementations.

FIG. 5 illustrates select example components of an example portable computing device 104 according to some implementations. The portable computing device 104 may be implemented as any of a number of different types of portable computing devices. Some examples of the portable computing devices 104 may include wearable computing devices 104-1, such as computing devices built into articles of clothing, as well as belt-mounted computing devices, watch-type computing devices, wrist-band-type computing devices, or other body-mounted computing devices; augmented reality devices, helmets, goggles or glasses 104-2; digital media devices and eBook readers 104-3; tablet computing devices 104-4; smart phones, mobile devices and portable gaming systems 104-5; laptops, netbooks and other portable computers 104-6, and any other portable device capable of sending communications and performing the functions according to the techniques described herein.

Further, some or all of the portable computing devices 104 herein may provide augmented reality functionality, such as through built-in features and/or through software installed on the portable computing devices. For example, a smart phone, tablet or other portable computing device 104 may be enabled with augmented reality functionality through execution of one or more augmented reality applications or other computer programs on the portable computing device 104. Accordingly, the augmented reality examples herein are not limited to designated augmented reality portable computing devices such as goggles or glasses. As one example, a camera on a portable computing device may be used to obtain one or more images of an area surrounding a user. The portable computing device may provide the user with information, such as identification of individuals, objects, etc., in the area based on analysis of the image.

In a basic configuration, the portable computing device 104 includes, or accesses, components such as at least one processor 502, one or more computer-readable media 504, the one or more communication interfaces 204, and the one or more input/output (I/O) components 220. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable processor-executable instructions stored in the computer-readable media 504.

Depending on the configuration of the portable computing device 104, the computer-readable media 504 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 504 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the portable computing device 104 may access external storage, such as RAID storage systems, storage arrays, network attached storage, storage area networks, cloud storage, or any other medium that can be used to store information and that can be accessed by the processor 502 directly or through another computing device or network. Accordingly, the computer-readable media 504 may be computer storage media able to store instructions, modules or components that may be executed by the processor 502.

The computer-readable media 504 may be used to store and maintain any number of functional components that are executable by the processor 502. In some implementations, these functional components comprise instructions or programs that are executable by the processor 502 and that, when executed, implement operational logic for performing the actions and services attributed above to the portable computing devices 104. Functional components of the portable computing device 104 stored in the computer-readable media 504 may include the communication module 202 and the comparison module 404, as discussed above. Additional functional components may include the operating system 210 for controlling and managing various functions of the portable computing device 104 and for enabling basic user interactions with the portable computing device 104. The computer-readable media 504 may further include the one or more applications 224 that may be executed on the portable computing devices 104 for performing various functions and tasks.

In addition, the computer-readable media 504 may also store data, data structures and the like, that are used by the functional components. For example, data stored by the computer-readable media 504 may include the one or more content items 222 and the user's profile information 402. Depending on the type of the portable computing device 104, the computer-readable media 504 may also optionally include other functional components and data, such as other modules and data 506, which may include programs, drivers, etc., and the data used or generated by the functional components. Further, the portable computing device 104 may include many other logical, programmatic and physical components, of which those described are merely examples that are related to the discussion herein.

The portable computing device 104 may further include the one or more communication interfaces 204 and the one or more various I/O components 220. The I/O components 406 may include speakers, a microphone, a camera, and various user controls (e.g., buttons, a joystick, a keyboard, a keypad, a touch screen, etc.), a haptic output device, and so forth. For example, the operating system 210 of the portable computing device 104 may include suitable drivers configured to accept input from a keypad, keyboard, or other user controls and devices included with the I/O components 220. Other components included in the portable computing device 104 may include various types of sensors, which may include the GPS device 214 and other sensors 216 as discussed above.

FIG. 5 further illustrates that the portable computing device 104 includes the display 218, which may be passive, emissive or any other form of display. In some cases, the display 218 may be an electronic paper display, such as an electrophoretic or electrowetting display, as mentioned above. Other examples of electronic paper displays may include bi-stable LCD displays, micro electromechanical system (MEMS) displays, such as interferometric modulator displays, cholesteric displays, electrofluidic pixel displays, photonic ink displays, gyricon displays, and the like. In other implementations, or for other types of devices, the display 218 may be an active display such as a liquid crystal display, a plasma display, a light emitting diode display, an OLED (organic light-emitting diode) display, or any other suitable type of display able to present digital content thereon. Accordingly, implementations herein are not limited to any particular display technology. Alternatively, in some examples, the portable computing device 104 does not include a display. Additionally, the portable computing device 104 may include various other components that are not shown, examples of which include removable storage, a power source, such as a battery and power control unit, and so forth.

Figure 6:
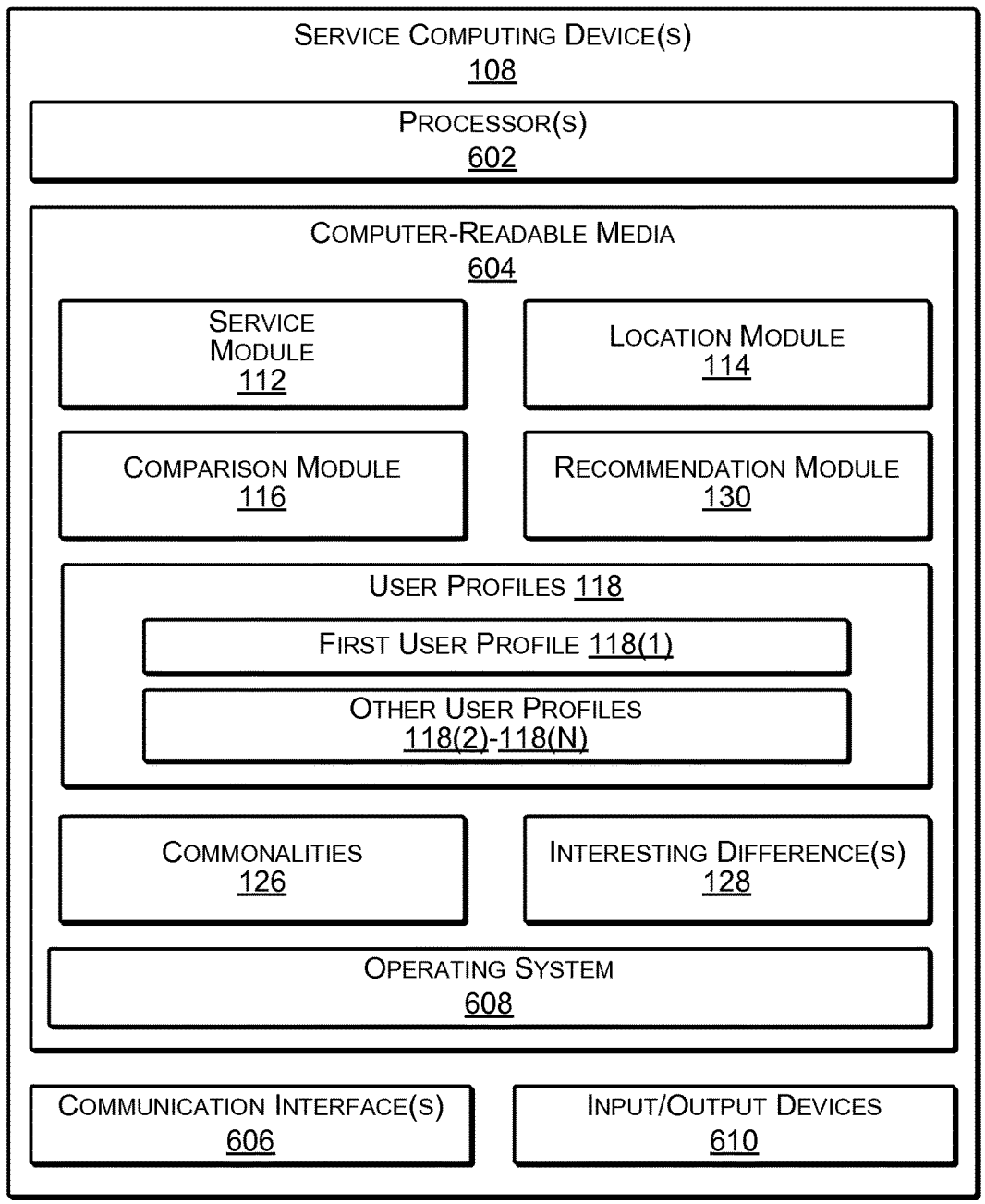
FIG. 6 illustrates select components of an example service computing device according to some implementations.

FIG. 6 illustrates select components of the one or more service computing devices 108 that may be used to implement some functionality of the commonality and difference determining techniques described herein. The one or more service computing devices 108 may include one or more servers or other types of computing devices that may be embodied in any number of ways. For instance, in the case of a server, the modules, other functional components and data may be implemented on a single server, a cluster of servers, a server farm or data center, a cloud-hosted computing service, a cloud-hosted storage service, and so forth, although other computer architectures (e.g., a mainframe architecture) may also be used. Further, while the figures illustrate the components and data of the one or more service computing devices 108 as being present in a single location, it is to be appreciated that these components may be distributed across different computing devices and different locations in any manner. Consequently, the functions may be implemented by one or more computing devices, with the various functionality described above distributed in various ways across the different computing devices. Multiple service computing devices 108 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, the one or more service computing devices 108 may each include one or more processors 602, one or more computer-readable media 604, and one or more communication interfaces 606. Each processor 602 may be a single processing unit or a number of processing units, and may include single or multiple computing units or multiple processing cores. The processor(s) 602 can be implemented as one or more microprocessors, microcomputers, microcontrollers, digital signal processors, central processing units, state machines, logic circuitries, and/or any devices that manipulate signals based on operational instructions. For instance, the processor(s) 602 may be one or more hardware processors and/or logic circuits of any suitable type specifically programmed or configured to execute the algorithms and processes described herein. The processor(s) 602 can be configured to fetch and execute computer-readable instructions stored in the computer-readable media 604.

The computer-readable media 604 may include volatile and nonvolatile memory and/or removable and non-removable media implemented in any type of technology for storage of information, such as computer-readable instructions, data structures, program modules or other data. Such computer-readable media may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of the service computing device(s) 108, the computer-readable media 604 may be a type of computer-readable storage media and/or may be a tangible non-transitory media.

The communication interface(s) 606 may include one or more interfaces and hardware components for enabling communication with various other devices over the network(s) 106, such as the portable computing devices 104 and/or computing devices associated with the websites 212. For example, communication interface(s) 606 may enable communication through one or more of the Internet, cable networks, cellular networks, wireless networks (e.g., Wi-Fi) and wired networks, as additionally enumerated elsewhere herein.

The computer-readable media 604 may be used to store any number of functional components that are executable by the processors 602. In many implementations, these functional components comprise instructions or programs that are executable by the processors 602 and that, when executed, specifically configure the one or more processors 602 to perform the actions attributed above to the one or more service computing devices 108. Functional components stored in the computer-readable media 604 may include the service module 112, the location module 114, the comparison module 116, and the recommendation module 130, as described above, which may be executed on the processors 602 for implementing the proximity-based commonality and difference determination described herein. Additional functional components stored in the computer-readable media 604 may include an operating system 608 for controlling and managing various functions of the one or more service computing devices 108.

In addition, the computer-readable media 604 may store data used for performing the operations described herein. Thus, the computer-readable media may store the user profiles 118, including the first user profile 118(1), and the other user profiles 118(2)-118(N). Commonalities 126 and interesting difference(s) 128 may also be stored in the computer-readable media 604, such as separately, or with the user profiles 118 of the corresponding user. The one or more service computing devices 108 may also include many other logical, programmatic and physical components, of which those described above are merely examples that are related to the discussion herein.

The one or more service computing devices 108 may further be equipped with various input/output devices 610. Such I/O devices 610 may include a display, various user interface controls (e.g., buttons, joystick, keyboard, mouse, touch screen, etc.), audio speakers, connection ports and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these program modules may be stored on computer storage media or transmitted across some form of communication media.

Figure 7:
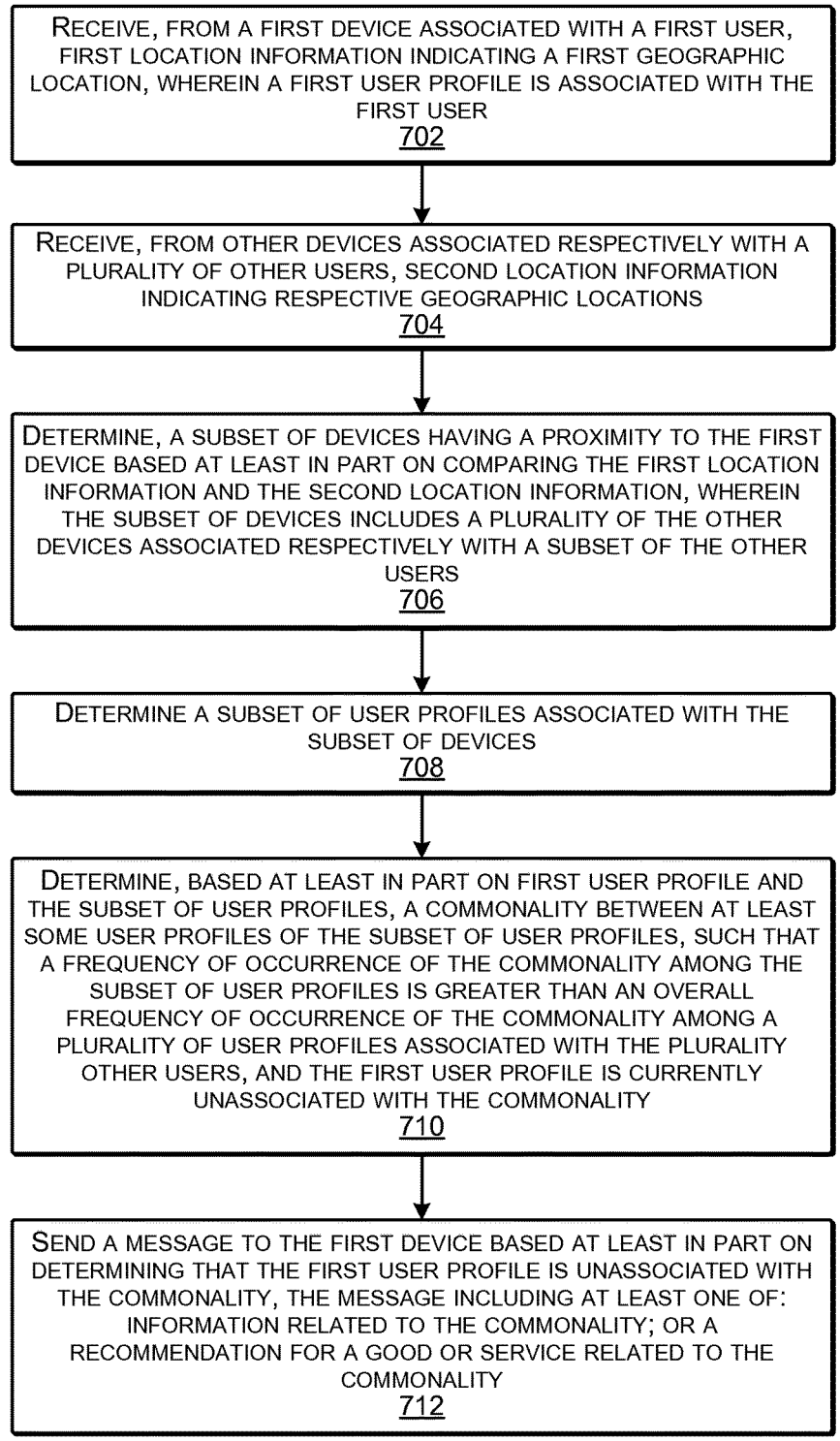
FIG. 7 is a flow diagram illustrating an example process for determining user commonalties according to some implementations.

FIG. 7 is a flow diagram illustrating an example process 700 that may be executed, at least in part, by one or more computing devices to determine commonalties and differences according to some implementations.

At 702, the one or more computing devices may receive, from a first device associated with a first user, first location information indicating a first geographic location, wherein a first user profile is associated with the first user. For example, the first user profile may include some or all of the user information in the user profile 118 discussed above with respect to FIGS. 1 and 2, and/or other user-related user information. Further, the first location information may be received as discussed above with respect to FIGS. 1 and 2.

At 704, the one or more computing devices may receive, from other devices associated respectively with a plurality of other users, other location information indicating respective geographic locations. For example, the one or more computing devices may receive the second location information as discussed above with respect to FIGS. 1 and 2.

At 706, the one or more computing devices may determine a subset of devices having a proximity to the first device based at least in part on comparing the first location information and the other location information. For example, the subset of devices may include a plurality of the other devices associated respectively with a subset of the other users. Furthermore, the comparing the first location information and the other location information to determine the subset of devices may include at least one of: determining that the first user device and the subset of devices are within a threshold distance of each other; determining that the first user device and the subset of devices are currently present at the first geographic location or one or more associated geographic locations; or determining that the first user device and the subset of devices have been present at the first geographic location or one or more associated geographic locations in the past.

At 708, the one or more computing devices may determine a subset of user profiles associated with the subset of devices. For example, the one or more computing devices may access the other user profiles 118(2)-118(N) to determine which of those profiles are associated with the subset of devices.

At 710, the one or more computing devices may determine, based at least in part on first user profile and the subset of user profiles, a commonality between at least some user profiles of the subset of user profiles, such that a frequency of occurrence of the commonality among the subset of user profiles is greater than an overall frequency of occurrence of the commonality among a plurality of user profiles associated with the plurality other users, and the first user profile is currently unassociated with the commonality.

As one example, the one or more computing devices may determine the commonality by comparing information from each user profile in the subset of user profiles with information from each other user profile in the subset of user profiles to determine matching information, and comparing the matching information with information from the first user profile to determine whether the first user profile is unassociated with the matching information. For instance, some or all of the other users may have read the same book, traveled to the same country, etc. This is matching information for those user profiles corresponding to the other users that have done this, and therefore may be used as a commonality. Further, based at least in part on determining that the first user profile is unassociated with the matching information, the matching information may be considered as a candidate for use as the commonality. Additionally, if the frequency of occurrence of the matched information among other user profiles in the subset of user profiles is substantially greater than a frequency of occurrence of the matching information among the user profiles of a larger population of users, then this matching information may be considered sufficiently interesting for use as the commonality, such as for sending a message to the first user, as discussed next.

At 712, the one or more computing devices may send a message to the first device based at least in part on determining that the first user profile is unassociated with the commonality. For example, the message may include information related to the commonality and/or may include a recommendation related to the commonality, such as for a good or service, as well as pointing out the difference of the first user from the other users that share the commonality, as discussed above. Additionally, in some examples, the one or more computing devices may determine a past association between the first user profile and a particular second user profile associated with a particular other user device in the subset of the other user devices. For instance, the past association may be determined based on at least one of prior communications between the first user device and the particular other user device, or calendar information associated with the first user that includes information related to the particular other user. The one or more computing devices may further determine a topic of conversation for the first user with respect to the particular other user based at least in part on the past association.

Figure 8:
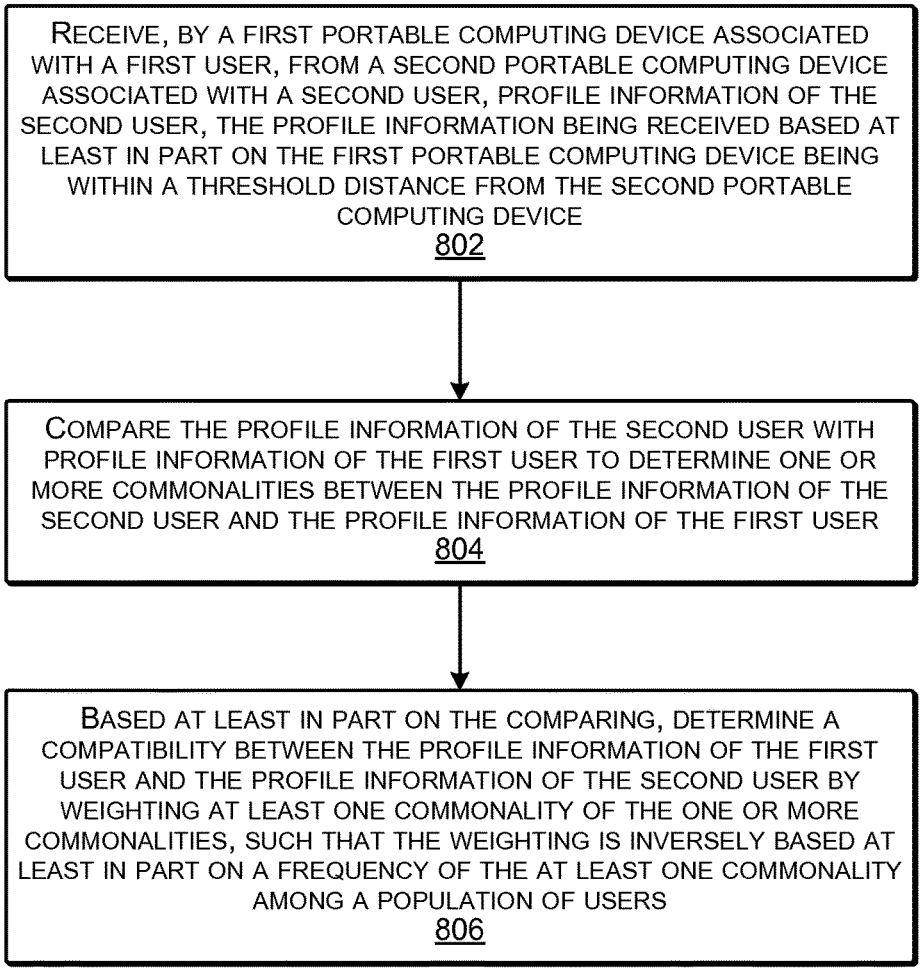
FIG. 8 is a flow diagram illustrating an example process for determining user commonalties according to some implementations.

FIG. 8 is a flow diagram illustrating an example process 800 that may be executed by a portable computing device to determine commonalties between users according to some implementations.

At 802, a first portable computing device associated with a first user may receive, from a second portable computing device associated with a second user, profile information of the second user. For example, the profile information may be received based at least in part on the first portable computing device being within a threshold distance from the second portable computing device. In some instances, the first portable computing device may determine the threshold distance based at least in part on at least one of: determining that the first portable computing device and the second portable computing device are able to communicate through a same wireless access point; or determining that the first portable computing device and the second portable computing device are able to communicate directly via a close-range communication protocol.

At 804, the first portable computing device may compare the profile information of the second user with profile information of the first user to determine one or more commonalties between the profile information of the second user and the profile information of the first user. For instance, the profile information may be compared by a comparison module on the first portable computing device to identify matching profile information such that each match of profile information may be counted as a commonality.

At 806, based at least in part on the comparing, the first portable computing device may determine a compatibility between the first user and the second user by weighting at least one commonality of the one or more commonalties. For instance, the weighting may be inversely based at least in part on a frequency of the at least one commonality among a larger population of users. In addition, the first portable computing device may determine a compatibility score and/or a topic for conversation between the first user and the second user. For example, if the first user and second user have both recently read an obscure paper or book that has been read by a very small percentage of the larger population, this commonality may be weighted heavily to increase the compatibility score, and may further be presented as a topic for conversation. In some examples, the first portable computing device may present, on a display associated with the first portable computing device, the at least one of the compatibility score or the topic of conversation as at least part of a notification generated to the first user.

In some examples, the first portable computing device may determining the compatibility score based at least in part on a number of commonalties between the second user profile information and the first user profile information determined from the comparing the profile information of the second user with the profile information of the first user. Additionally, in some examples, the first portable computing device may determine a first compatibility score between the first user and the second user, and send information indicating an identity of the second user to a remote computing device that maintains first user profile information related to the first user and second user profile information related to the second user, such as when the first compatibility score exceeds a threshold. In response, the first portable computing device may receive, from the remote computing device, a second compatibility score based at least in part on the first user profile information and the second user profile information. Based at least in part on at least one of the first compatibility score or the second compatibility score exceeding a compatibility score threshold, the first portable computing device, may generate a notification to the first user to inform the first user that the second user has been determined to have a compatibility with the first user that exceeds a threshold level. In some cases, the user may be able to set or otherwise control the threshold level of compatibility for generating the notification. In some examples, the notification may include the topic for conversation, the compatibility score(s), information about at least one shared commonality, such as a highly weighted commonality as discussed above, or the like.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media maintaining instructions which, when executed by the one or more processors, specifically configure the one or more processors to:
receive, from a first device associated with a first user profile, first location information indicating a first geographic location;
receive, from a first set of other devices, other location information indicating respective geographic locations of the other devices;
determine a second set of other devices based at least in part on comparing the first location information and the other location information, the second set of other devices comprising a second other device of the first set of other devices that has a first proximity to the first device and a third other device of the first set of other devices that has a second proximity to the first device;
determine a first set of other user profiles, the first set of other user profiles comprising a second user profile and a third user profile, the second user profile being associated with at least the second other device of the second set of other devices and the third user profile being associated with at least the third other device of the second set of other devices;
determine, based at least in part on the first user profile and the first set of other user profiles, a commonality between at least some user profiles of the first set of other user profiles;
determine, based at least in part on the commonality, that the first user profile differs from the at least some user profiles;

determine a first frequency that the commonality is associated with other user profiles of the first set of other user profiles, wherein the first user profile is unassociated with the commonality;

determine a second frequency that the commonality is associated with other user profiles of a second set of other user profiles, wherein the second set of other user profiles comprises the first set of other user profiles and at least one additional other user profile;

determine that the first frequency is greater than the second frequency; and send a message to the first device based at least in part on (i) the first user profile differing from the at least some user profiles and (ii) that the first frequency is greater than the second frequency, the message including at least one of:

information related to the commonality; or a recommendation for a good or service related to the commonality.

2. The system as recited in claim 1, wherein the one or more processors are further configured to:

compare information from the second each other user profile with information from one or more other user profiles in the first set of user profiles to determine matching information;

comparing the matching information with information from the first user profile to determine whether the first user profile is unassociated with the matching information; and use the matching information as the commonality based at least in part on determining that the first user profile is unassociated with the matching information.

3. The system as recited in claim 1, wherein comparing the first location information and the other location information comprises at least one of:

determining that the first device and the second other device of the first set of other devices are within a threshold distance of each other;

determining that the first device and the second other device are currently present at the first geographic location or one or more associated geographic locations; or determining that the first device and the second other device have been previously present at the first geographic location or one or more associated geographic locations.

4. The system as recited in claim 1, wherein the one or more processors are further configured to:

determine a past association between the first user profile and the second user profile associated with the second other device of the first set of other device, wherein determining the past association is based on at least one of:

prior communications between the first device and the second other device; or calendar information associated with the first user profile that includes information related to the second user profile; and determine a topic of conversation for the first user with respect to a second user associated with the second user profile based at least in part on the past association.

5. A method comprising:

receiving, by one or more processors, location information, the location information including at least first location information from a first device associated with a first user profile;

receiving second location information from a first set of other devices;

determining, by the one or more processors, based at least in part on the location information, a second set of other devices, the second set of other devices comprising a second other device and a third other device, the second other device being located within a threshold proximity to the first device and the third other device being located within the threshold proximity of the first device;

determining, by the one or more processors, a first set of other user profiles, the first set of other user profiles comprising a second user profile and a third user profile, the second user profile being associated with at least the second other device and the third user profile being associated with at least the third other device;

determining, by the one or more processors, a commonality between at least the second user profile and the third user profile;

determining, by the one or more processors and based at least in part on the commonality, that the first user profile is not associated with the commonality;

determining, by the one or more processors, a first frequency that the commonality is associated with other user profiles of the first set of other user profiles;

determining a second frequency that the commonality is associated with other user profiles of a second set of other user profiles, wherein the second set of other user profiles comprises the first set of other user profiles and at least one additional other user profile;

determining that the first frequency is greater than the second frequency; and sending, by the one or more processors, a message to the first device based at least in part on the first frequency being greater than the second frequency.

6. The method as recited in claim 5, further comprising determining a location-based virtual proximity between the first device and the second other device based at least in part on user location histories and at least one of: user purchase histories, user review/ratings histories, user media consumption histories, user-provided information, user social network information, user achievements, user membership information, user communication information, user microblog information, or implicit user interests.

7. The method as recited in claim 5, further comprising determining a proximity between the first device and the second other device based at least in part on at least one of:

a first determination that the first device and the second other device are within a geographic threshold distance of each other;

a second determination that the first device and the second other device are present at a same geographic location or associated geographic locations; or a third determination that the first device and the second other device have visited, in the past, at least one of a same geographic location or a same associated geographic location.

8. The method as recited in claim 5, further comprising determining the commonality based at least in part on determining that a majority of other user profiles of the first set of other user profiles are associated with the commonality and that a minority of other user profiles of the second set of other user profiles are associated with the commonality.

9. The method as recited in claim 5, further comprising determining the commonality based at least in part on determining that the commonality is related to a good or service.

10. The method as recited in claim 5, further comprising determining the commonality based at least in part on at least one of:
   determining the commonality based on a location related to a physical proximity between the first device and the second other device; or
   determining the commonality based on a social connection determined from information from the first user profile and information from the first set of other user profiles.

11. The method as recited in claim 5, wherein the sending the message comprises at least one of:
   sending information related to the commonality; or
   sending a recommendation for a good or service related to the commonality.

12. The method as recited in claim 5, further comprising determining a compatibility between the first user profile associated with the first device and the second user profile associated with the second other device, wherein the compatibility is determined based at least in part on a number of commonalties determined between the first user profile and the second user profile.

13. The method as recited in claim 12, further comprising weighting one or more of the number of commonalties, wherein a first weight assigned to a commonality of the one or more commonalties is inversely based at least in part on the second frequency that the commonality is associated with other user profiles of the second set of other user profiles.

14. A system comprising:
   one or more processors; and
   one or more computer-executable instructions that, when executed by the one or more processors, specifically configure the one or more processors to:
      receive first location information from a first device associated with a first user profile;
      receive second location information from a first set of other devices;
      determine, based at least in part on the first location information, a second set of other devices, wherein the second set of other devices comprises at least a second other device and a third other device, the second other device being located within a threshold proximity to from the first device and the third other device being located within the threshold proximity from the first device;
      determine a first set of other user profiles, wherein the first set of other user profiles comprises a second user profile and a third user profile, the second user profile being associated with the second other device and the third user profile being associated with the third other device;
      determine a commonality between the second user profile and the third user profile;
      determine, based at least in part on the commonality, that the first user profile is not associated with the commonality;
      determine a first frequency that the commonality is associated with other user profiles of the first set of other user profiles;
      determine a second frequency that the commonality is associated with other user profiles of a second set of other user profiles, wherein the second set of other user profiles comprises the first set of other user profiles and at least one additional other user profile;
      determine that the first frequency is greater than the second frequency; and
      send a message to the first device based at least in part on the first frequency being greater than the second frequency.

15. The system as recited in claim 14, wherein the one or more processors are further configured to determine a location-based virtual proximity between the first device and the second other device based at least in part on user location histories and at least one of: user purchase histories, user review/ratings histories, user media consumption histories, user-provided information, user social network information, user achievements, user membership information, user communication information, user microblog information, or implicit user interests.

16. The system as recited in claim 14, wherein the one or more processors are further configured to determine a proximity between the first device and the second other device based at least in part on at least one of:
   a first determination that the first device is within a threshold distance from the second other device;
   a second determination that the first device and the second other device are present at a same geographic location or associated geographic locations; or
   a third determination that the first device and the second other device have previously visited at least one of a same geographic location or a same associated geographic location.

17. The system as recited in claim 14, wherein the one or more processors are further configured to determine the commonality based at least in part on determining that a majority of other user profiles of the first set of other user profiles are associated with the commonality and that a minority of other user profiles of the second set of other user profiles are associated with the commonality.

18. The system as recited in claim 14, wherein the one or more processors are further configured to determine the commonality based at least in part on at least one of:
   a location related to a physical proximity between the first device and the second other device; or
   a social connection determined from first information from the first user profile and second information from the first set of other user profiles.

19. The system as recited in claim 14, wherein the one or more processors are further configured to determine a compatibility between the first user profile and the second user profile based at least in part on a number of commonalties determined between the first user profile and the second user profile.

20. The system as recited in claim 19, wherein the one or more processors are further configured to apply a weight to one or more commonalties of the number of commonalties, wherein a first weight assigned to a commonality of the one or more commonalties is inversely based at least in part on the second frequency that the commonality is associated with other user profiles of the second set of other user profiles.

* * * * *